United States Patent Office 3,153,771
Patented Oct. 20, 1964

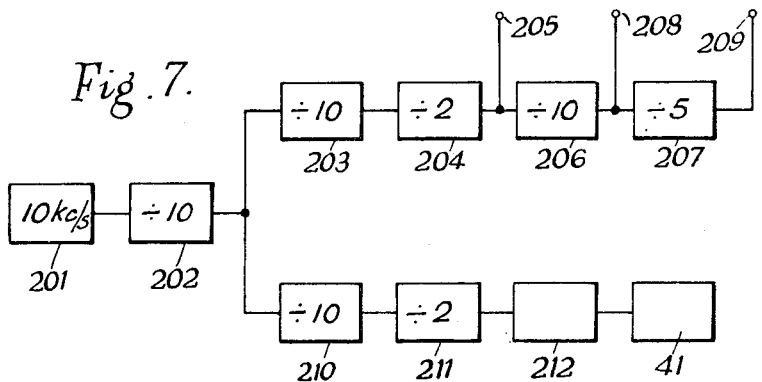
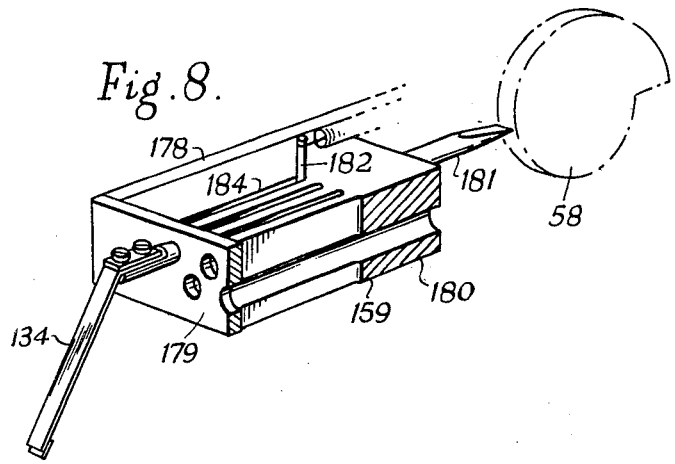
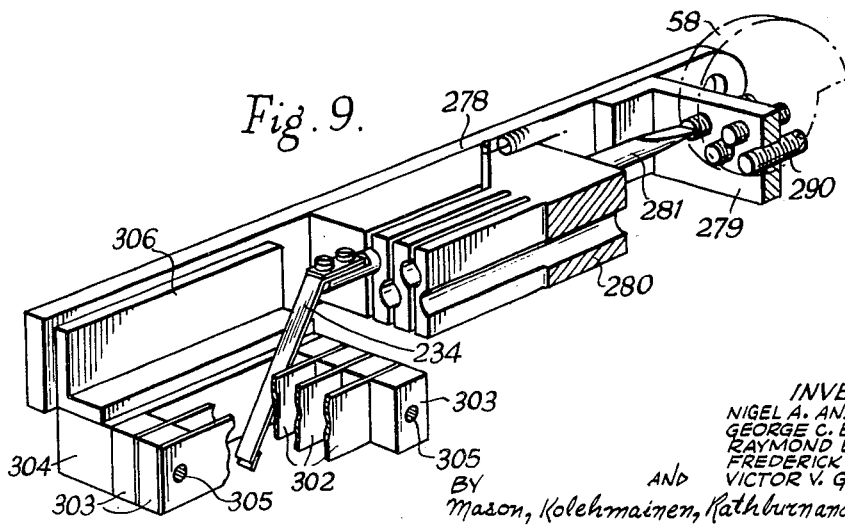

3,153,771
RECORDING APPARATUS FOR USE IN MAKING AND INTERPRETING SEISMOGRAPHIC RECORDS
Nigel A. Anstey, Chelsfield, Raymond E. Green, Orpington, and George C. Baird and Frederick W. Hales, Bromley, England, and Victor V. Graf, Tulsa, Okla., assignors to Seismograph Service Corporation, Tulsa, Okla., a corporation of Delaware
Filed Aug. 7, 1958, Ser. No. 753,741
26 Claims. (Cl. 340—15.5)

This invention relates to methods of and apparatus for use in producing and interpreting seismographic records.

When carrying out seismic surveys it is usual to fire an explosive charge or "shot" and to receive, by means of a number of spaced geophones, which are usually regularly spaced along a line extending through the shot point, the signals which have been transmitted from the shot point through the ground and which have been reflected and/or refracted in the latter. Records are made of the signals received by the geophones, from which records the received signals, including particularly those which have been reflected at sub-surface interfaces, are identified and their travel times are calculated. From the results obtained the depth and inclinations of the interfaces, and thus of strata in the earth's crust, are derived.

It has been common practice for the geophone signals, after suitable amplifications and any necessary filtering, to be recorded in the form of traces on paper or similar record sheets. It has been found that if all the signals which have originated from a single shot, as received by the various geophones, are recorded as parallel traces on a single sheet, the identification of the important reflected signals, from amongst the other signals received, is greatly facilitated.

In the past, the records produced have usually been of a linear type, the lateral displacement of the lines of the traces being representative of the varying amplitudes of the signals obtained from the geophones. Experiments have, however, shown that the reading of the records and the identification of true reflected signals are greatly helped if the traces are produced in the form of variable density records, the received signals being shown in the form of straight, parallel traces the varying densities of which are derived from and are indicative of the varying amplitudes of the signals from the individual geophones.

It has, in fact, been found that, when such variable density traces are produced close together with little or no clear space between them, the effect produced appears at first sight to represent a cross-section through the earth's crust, taken along a vertical plane through the line of the geophones and the shot point. From this record the signals obtained from reflecting interfaces can be identified with greater ease and certainty than when using other more usual forms of recording.

It will be observed, however, that in spite of its resemblance to a cross-sectional view, such a variable density record does not, in fact, represent a true cross-section of the earth's crust. One reason for this is that when making the record no account was taken of a number of very important corrections which have to be made before the depth and inclination of a reflecting layer can be obtained from the seismic signals.

An important correction is the spread correction, which allows for the fact that the paths of a reflected signal from the shot point to a geophone, by way of a reflecting interface, are not vertical but are inclined to the vertical. More correctly speaking they are inclined to the normal to the interface, at the point of reflection, at angles which are determined very largely by the distance of the geophone from the shot point, by the depth of the interface and by the angle of the interface to the horizontal.

Consequently, when recording the signals received by a number of geophones following the firing of a shot, a different spread correction will be necessary for each geophone, such corrections being determined primarily by the distances of the different geophones from the shot point and by the depths of the reflecting interfaces. The greater the distance of the geophone from the shot point, the greater will be the spread correction for a given reflecting layer, while the greater the depth of the layer the less will be the correction. The variation of the correction with depth is relatively large for very shallow reflecting layers, but falls off rapidly as the depth increases.

In addition to the spread or "dynamic" correction, further corrections will be required, which are generally described as "static" corrections. These include elevation or depth corrections (for variations in the surface level—or depth of water in the case of marine surveys) and weathering corrections (for variations in the thickness of weathered surface layers).

If the various corrections could be correctly made during the making of the record, a multi-trace record would be obtained in which the signal from the various geophones would be recorded at distances from a transverse zero line on the record sheet (representing a common time origin, which may or may not correspond to the time of the firing of the shot) which would be strictly proportional to the time taken by the seismic pulse to travel from a horizontal datum plane down to the layers by which the signals were reflected and back to the datum plane. The record sheet, particularly if of the variable density type as described above, would thus provide a visual cross-section of the earth's crust plotted in terms of two-way travel time rather than depth. On such a record the identities and positions of the reflecting layers could be picked out by eye with much greater ease and certainty than is possible using traces of the linear type, while the fact that the proper corrections were made during the making of the record would ensure that the alignments between adjacent traces would be properly represented on the record. This would be of great value when interpreting the results of the survey.

It is, accordingly, one of the objects of the present invention to provide a method of and apparatus for making a visual seismographic record by means of which the necessary dynamic and/or static corrections can be introduced during the making of the record.

A further object of the invention is the provision of improved methods of and apparatus for making variable density records, particularly during seismic surveying or when interpreting previously made magnetic or other seismic records, while yet another object is to provide an improved method of and apparatus for compositing a plurality of seismic records, as will be described.

Variable density records provide most important advantages and characteristics, when used for seismic recording and interpreting, and further advantages which follow from this use will be apparent from the description which follows. It is, accordingly, an important feature of this invention to provide efficient methods and apparatus for producing variable density records, which apparatus can be compactly and economically constructed and can be used in the field by a survey party during actual surveying. Such apparatus clearly possesses very great advantages over apparatus which, by reason of its nature, size and/or cost can only be used for re-recording in a central office, perhaps hundreds or thousands of miles away from the area being surveyed. The apparatus of the invention makes possible the production, on the site and at the actual time of surveying, of visible, variable-density records which can be examined and checked immediately, without requiring even any time for processing. Consequently if the record produced is not satisfactory for any reason the shot can be repeated and a fresh recording can be made immediately.

The same apparatus can also be used for producing properly corrected variable density records from magnetic or other recordings, whether or not these already include some or all of the necessary static and/or dynamic corrections, while it can also be used for compositing, as will be described.

According to the invention, in one of its aspects, a method is provided for producing a plurality of visible variable density records during the making or interpreting of seismic surveys, which comprises positioning a sheet of electro-chemical paper over a conductive plate and causing a carriage carrying a recording pen or pens to travel across the sheet with the pen or pens in contact with the latter, the platen and the or each pen being connected in an electrical circuit such that a current representative of a signal to be recorded by the or each pen is passed through the paper between the pen and the platen and produces on the paper a visible trace the density of which is controlled by the signal.

For carrying out this method the invention also provides recording apparatus comprising an electrically conductive platen, a carriage carrying one or a plurality of pens, means for moving the carriage across the platen at a controlled speed with the pen or pens in contact with a sheet of paper resting on the platen, means for supplying to the or each pen an electric current representing the signal to be recorded and means for moving the sheet forward after recording into position for a further recording to be made parallel to the first.

It is preferred, according to this invention, that the sheet should be in the form of an elongated strip (normally supplied in the form of a roll) and that the carriage should travel transversely across the width of the strip during recording. This provides a number of important advantages, including the ability to use any desired number of pens, and more especially, the ability to make as many successive recordings (each with one or more pens) with the successive recordings parallel and sufficiently close to each other for easy comparison.

Although in certain cases, for example when re-recording from magnetic or other records it is possible to make each successive record using only a single pen, it is essential when carrying out direct recording to use a number of pens and to provide means for introducing the necessary corrections into the records as they are made and it is an important object of the invention to provide means for doing this.

According, therefore, to a further feature of this invention, a method is provided for producing a seismographic record of the signals received by a number of geophones during the making of a seismic survey, or during the re-recording of seismic records, which comprises causing a plurality of recording elements, each of which is supplied with a signal derived, directly or indirectly, from one (or a number) of the geophones following the production of a seismic signal, to travel over a record sheet so as to produce on that sheet traces corresponding to the signals, wherein some at least of the recording elements are caused to move automatically during recording, relatively to each other, in order to introduce progressively varying time corrections in the records made.

The form and extent of such varying or dynamic corrections can be previously calculated or otherwise determined and can be set or introduced into the recording apparatus before recording is carried out. In addition fixed or static corrections can be introduced by making preset adjustments of the relative positions of the recording elements before recording is started and the provision of means for making such adjustments prior to recording independently of the means used for introducing the varying or dynamic corrections constitutes a useful and valuable feature of this invention.

The invention, in another of its aspects, accordingly provides apparatus for making records of the signals received by a plurality of receiving units and for introducing into such records both static corrections and corrections which vary individually with time, wherein the apparatus comprises means for supporting a record sheet, means for causing a plurality of recording elements to travel over the sheet, by relative movement between the recording elements and the sheet, so as to produce on the sheet traces corresponding to the signals to be recorded, correcting means for moving at least some of the recording elements relatively to each other during recording in order to introduce into the records time corrections which themselves vary with time in a predetermined manner and means independent of the said correcting means for making fixed adjustments in the relative positions of the recording elements, prior to recording, in order to introduce static corrections into the records produced.

According to a preferred method of carrying out the invention and using the said apparatus, the signals from the geophones (or other receiving units) are preferably supplied directly to the recording elements, by way of the usual amplifiers and any necessary filters or other signal modifying or controlling means, in order that visual variable-density records may be made at the time when the signals are being received. It would, however, be possible for the correlated variable density records of the invention to be made indirectly. This could be done by making magnetic or other records (not corrected for time) of the signals from the receiving units and by then using these uncorrected record signals to operate the recording elements to produce the time-corrected visible records of the invention.

Alternatively, the magnetic or other recording could be corrected wholly or partially, either during recording or during playback, in which case some or all of the corrections would not have to be applied to the recording elements used for making variable density records.

As has been stated, the methods and apparatus of the invention are especially valuable when variable density traces are being produced. The invention, in certain of its aspects, is however, also applicable when visual records of other kinds are being made.

As has been mentioned above, the present invention is also applicable to composition.

In seismic surveying one of the major problems which is encountered is the difficulty of identifying and distinguishing the important reflected signals from uncorrelated signals and noise, including surface noises of various kinds. One of the procedures which has been suggested and tried, in order to assist in achieving this, consists in firing a number of shot charges at different points which are spaced from each other veritcally, and/or horizontally in a group, for example at different depths in one bore hole, or at the same or different depths in a number of bore holes. The signals received by the geophones from the different shots of the group are then superimposed or composed by suitable means, for which purpose electromagnetic recording has been used.

Provided that the necessary corrections are made for difference in depth of the shots and that, in the case of horizontally spaced shots, the distance between the various shots are not so great as to introduced serious discrepancies between the theoretically correct dynamic corrections for the different shots and the common or average corrections which are applied to the signals from all the shots of a group when recording, the result obtained will be that the correlatable recorded signals due to waves which have been reflected from sub-surface strata will be generally additive and will thus be accentuated in the records, while the uncorrelated signals will tend to be cancelled out during recording.

The above procedure is also applicable to and provides particular advantages when the so-called "thumping" technique is employed and the seismic signals are produced by dropping a heavy weight on to the ground, instead of by shot firing. The thumping method has the great advantage of avoiding the need for drilling holes, which is expensive and time consuming.

The superimposing or adding together of the signals derived from a number of shots or "thumps" has, however, set its own problem, if a correct addition of one signal to another is to be obtained. Photographic methods are of limited use because the sensitivity of the photographic emulsion depends on any previous exposure. Thus, if one signal is first recorded photographically on a film or the like and a further signal is then recorded superimposed on the first, the second one will not be correct owing to variations in the residual sensitivity of the films with variations in the exposure of the first recording. In the case of direct magnetic recording, if an attempt is made to record a signal on top of a previously recorded signal, the original signal will be partially erased by the high-frequency "bias" waveform applied with the second.

Owing to the above difficulties, the procedure has been adopted of recording the received signals individually and then superimposing one signal on another by re-recording, the signals from the two original records being added together electrically, in order to form the composite record. The latter then can be combined with a signal from another record, which can be that derived from a single shot or from a composite record produced from two separate shots. The above procedure can be continued as necessary until all the signals have been super-imposed, so as to produce a single combined record. During re-recording, the necessary adjustments are made to ensure that all the original signals are equally represented in the final record.

The above method of recording is satisfactory in some respects, but it suffers from certain disadvantages and limitations, among which mention may be made of the fact that the magnetic recorder used must possess a greater number of channels than the number of signals received. In practice, the number of channels needs to be at least twice the number of signals.

The recording methods and apparatus which have been referred to above and which will be more fully described hereinafter can be adapted and used with particular advantage for producing combined records derived from a number of signals which are superimposed or composited during recording and the method and means for doing this form an important feature of the present invention.

According, therefore, to one of the features of this invention, a method is provided of producing a record derived from a number of separate signals which are added together, one upon the other, during recording, which comprises forming a variable-density record representative of one signal, or combination of signals, by electro-chemical deposition, after which a further record derived from another signal, or combination of signals, is recorded superimposed on the first one.

The above procedure can ve repeated as often as necessary until all the required signals have been recorded superimposed one upon the other. During recording, the relative strengths of the signal, or of the combinations of signals, being recorded can be controlled so that in the final record each signal provides a desired fraction of the total recording. Thus each signal can be equally represented in the record produced.

The effect of the repeated superimposed recording will be to produce a record in which reflected signals which are in phase with each other will reinforce each other in the dark half-cycles, while leaving the other-half-cycles light, while uncorrelated signals which are out of phase will tend to produce a uniform medium tone in the record.

Because the recording process is one of electro-chemical deposition, the recording sensitivity will remain substantially constant for all the recording sweeps until the dark areas become saturated. If a recording paper is used which has to be kept wet during recording, it is of course important that it should be allowed to dry between sweeps.

The above method offers the great advantages that it can be used in the field to produce, as the survey proceeds, records in visible form which are immediately available for examination and interpretation. To do this, as each shot is fired the received signals are recorded on the record sheet, the successive recordings being superimposed one upon the other along a single recording track.

An analagous procedure can also be used for producing visible records by re-play from magnetic tapes or other reproducible records and this can be done in such a way that the final record produced is of a variable density, cross-sectional form, similar to that referred to above, being made up of a number of parallel, variable density traces each of which is properly time corrected and represents the signal received by one of a number of geophones or groups of geophones which are spaced at different distances from the shot or thump point. In the present case, however, each trace will represent a summation of the signals derived from a number of shots or thumps which have been received by one particular geophone or group of geophones.

If means are provided for applying static and dynamic corrections between the magnetic recording and the variable density recording, which corrections can be produced during re-play either in the variable density recorder or in the magnetic recorder (if the latter includes the necessary means for making the corrections) it becomes possible, not only to combine the signals from the shots or thumps of a single group but also so to combine the signals from different, spaced groups that the final record represents signals which have come from different groups but which have been reflected at the same point on a reflecting layer.

The invention in various of its aspects will now be described in greater detail, by way of example. Reference will be made to the accompanying drawings, in which.

Figure 4:
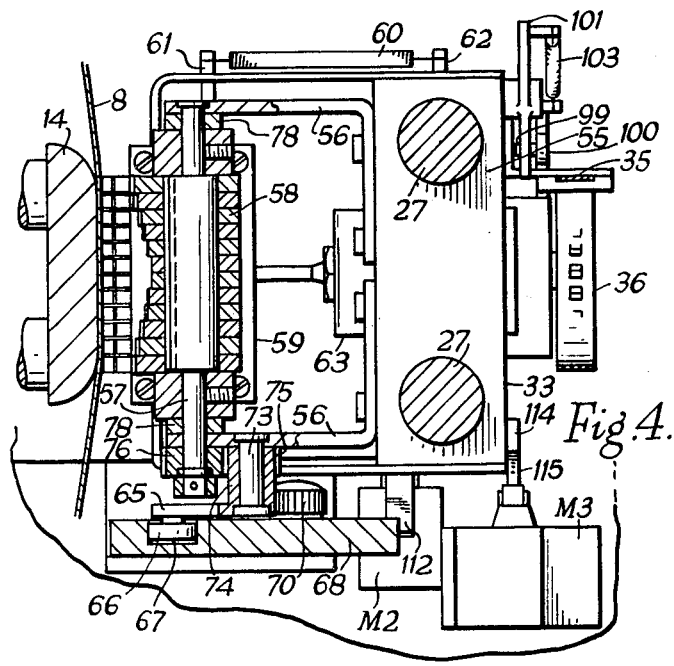
FIGURE 4 is a detail sectional view, also to a larger scale, taken on the line IV—IV of FIGURE 3.
Figure 5:
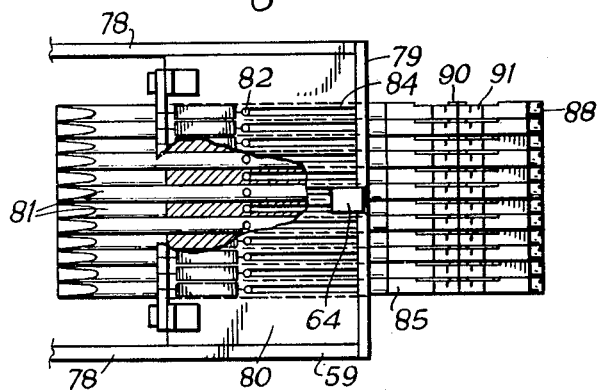
FIGURE 5 is a similar detail view, taken on the line V—V of FIGURE 3.
Figure 6A:
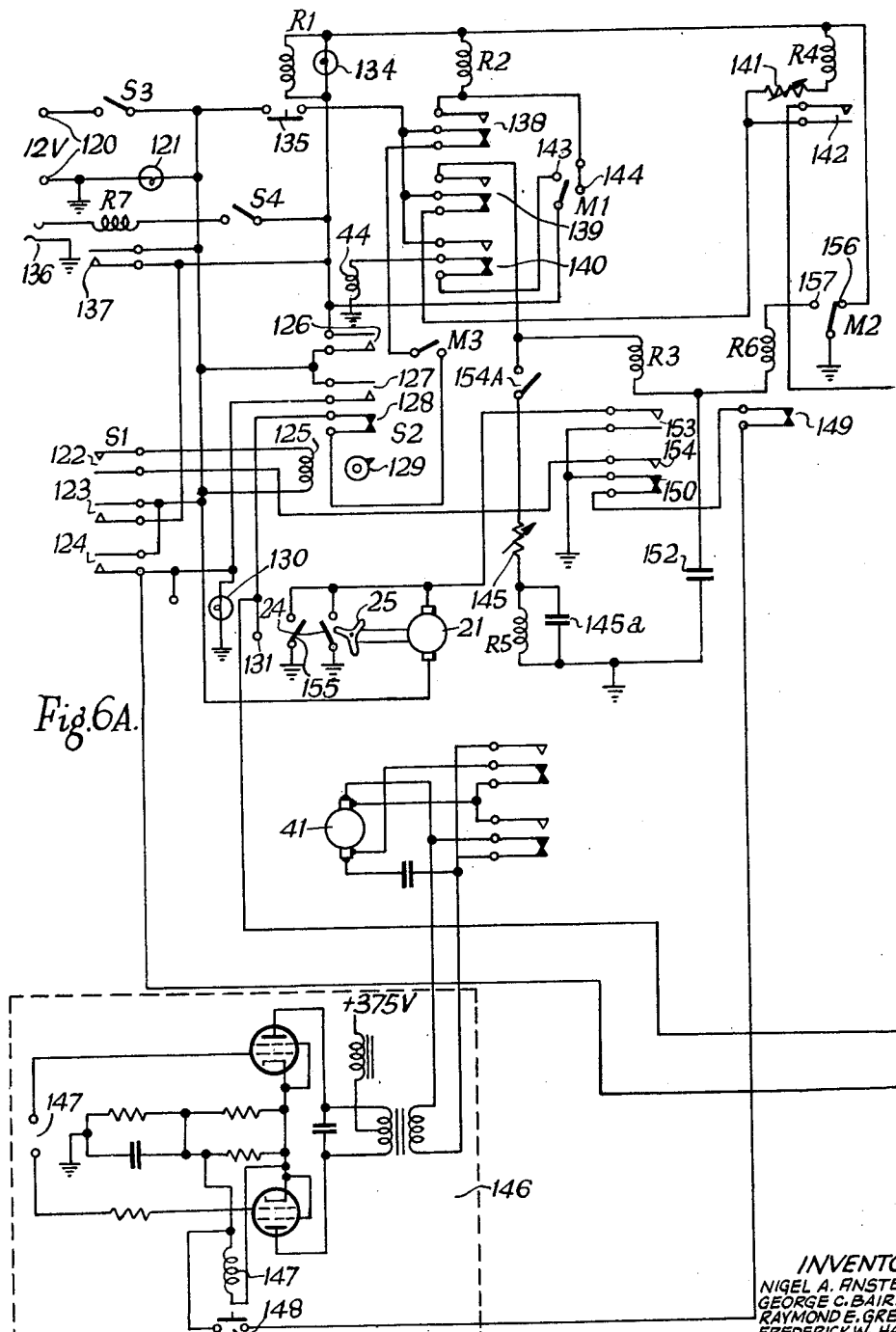
Figure 6B:
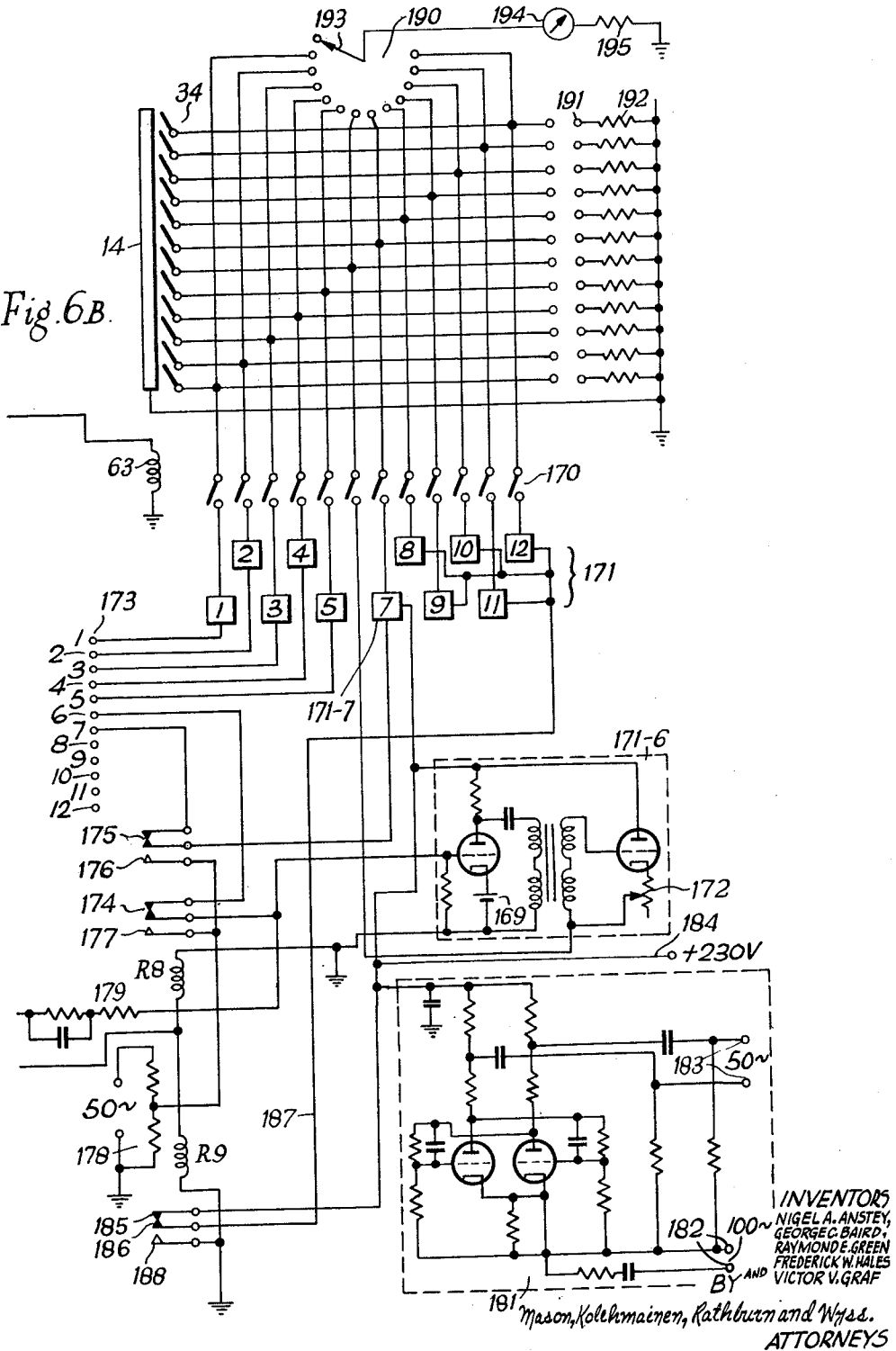

FIGURES 6A and 6B, which together constitute a single FIGURE 6, provide a circuit diagram showing diagrammatically details of the electrical circuit and connections of the apparatus shown in FIGURES 1 to 5;

FIGURE 7 is a block diagram showing a method of providing an accurate time standard;

FIGURES 8 and 9 are detail isometric views showing modified forms of recording carriage which may be used in place of that used in the apparatus shown in FIGURES 1 to 5.

Referring first to FIGURES 1 to 5 of the drawings, the apparatus comprises a casing 1 which is mounted on feet 2. Various panels of the casing are hingedly or removably fitted so that they can be removed to provide access to the mechanism. In particular, the front panel 3 (FIGURE 2) is openable to give easy access to a paper magazine 4, mounted in the bottom of the casing 1, and to the recording carriage and associated parts of the apparatus, which will be described in due course.

The magazine 4 is provided with brackets 5 (FIGURE 2) for supporting a roll 6 of recording paper, the insertion of which is effected by hinging open the front 7 of the magazine. If the paper used is of a kind which requires to be kept moist, the magazine 4 is made as nearly air-tight as possible and the paper 8 leaving the magazine is arranged to pass between rubber sealing strips 9 and 10, one of which 9 is mounted on the main body of the casing and the other of which 10 is mounted on the cover. Rollers 11 and 12, mounted on the cover 7 and the body of the casing respectively, guide the paper between the sealing strips.

Figure 2:
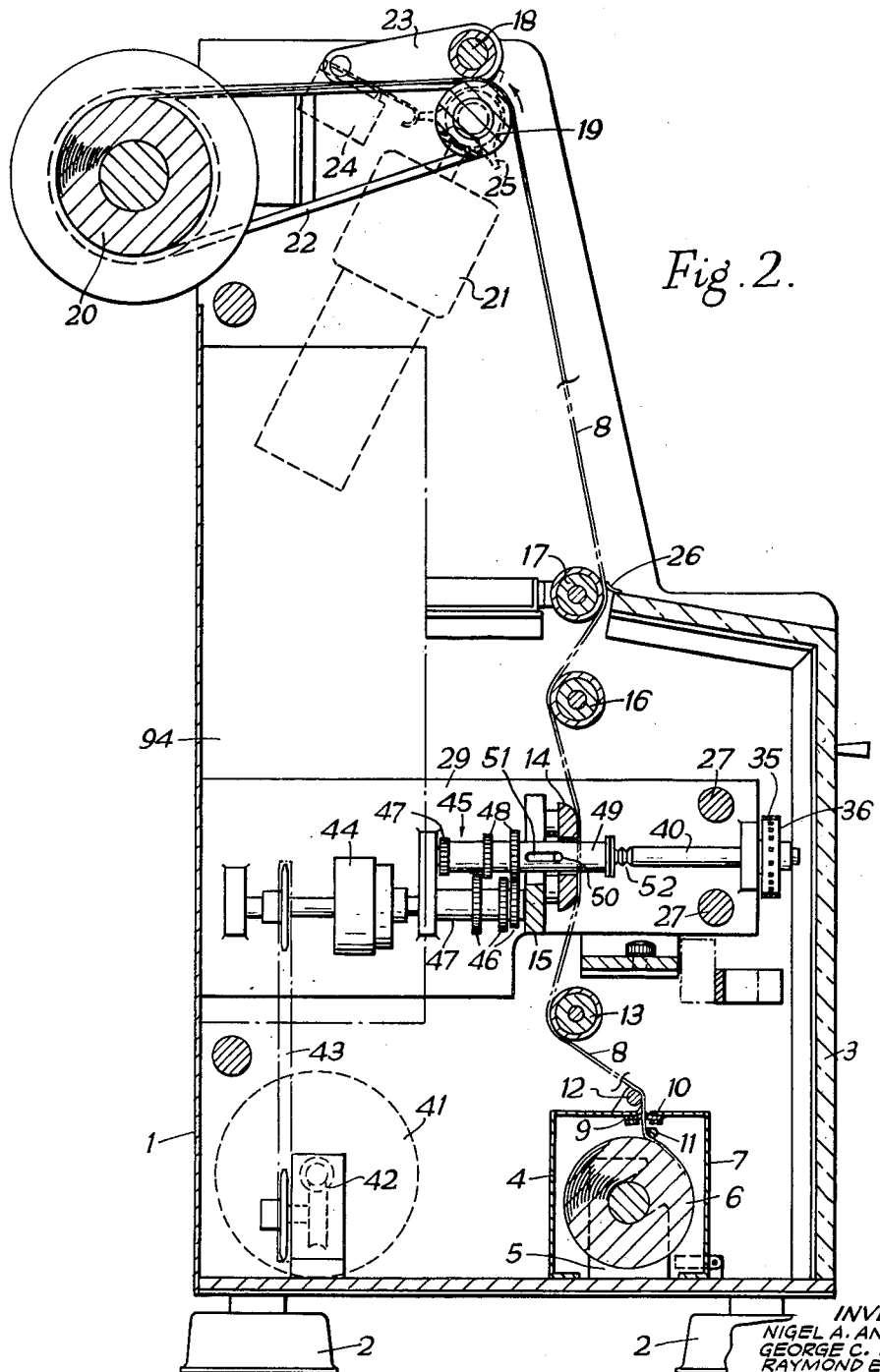
FIGURE 2 is a vertical section taken on the line II—II of FIGURE 1.

The paper 8, after leaving the magazine 4, passes round a roller 13 and over a recording back plate or platen 14, which latter is mounted on but insulated from a fixed support 15 (FIGURE 2).

After leaving the plate 14, the paper 8 passes round rollers 16 and 17 and between a pair of feed rollers 18 and 19 to a take-up roller 20. The main feed roller 19 is positively driven through a suitable bevel gear or worm drive from an electric motor 21. It also provides a frictional drive to the take-up roller 20 which is driven by means of a belt 22. The roller 18 is mounted on pivoted arms 23 and presses the paper against the main feed roller 19, thus ensuring that the feed of the paper is controlled by the roller 19.

A paper feed switch, the operation of which will be described, is shown at 24. It is arranged to be operated automatically, each time the paper has been fed forward by a predetermined distance, by the action of a spider 25 which rotates with the roller 19 and the arms of which actuate the normally closed switch 24 to open the latter.

In order that the paper may be kept moist, prior to and during recording, a sealing strip 26 is mounted on the front cover 3 and bears against the paper 8 where it passes over the roller 17. The lower part of the casing below this roller is closed as far as possible against free communicaiton with the atmosphere.

The paper 8 where it passes between the rollers 17 and 19 is visible, during recording, through an open or transparent window which is not specifically shown in the drawings.

Figure 1:
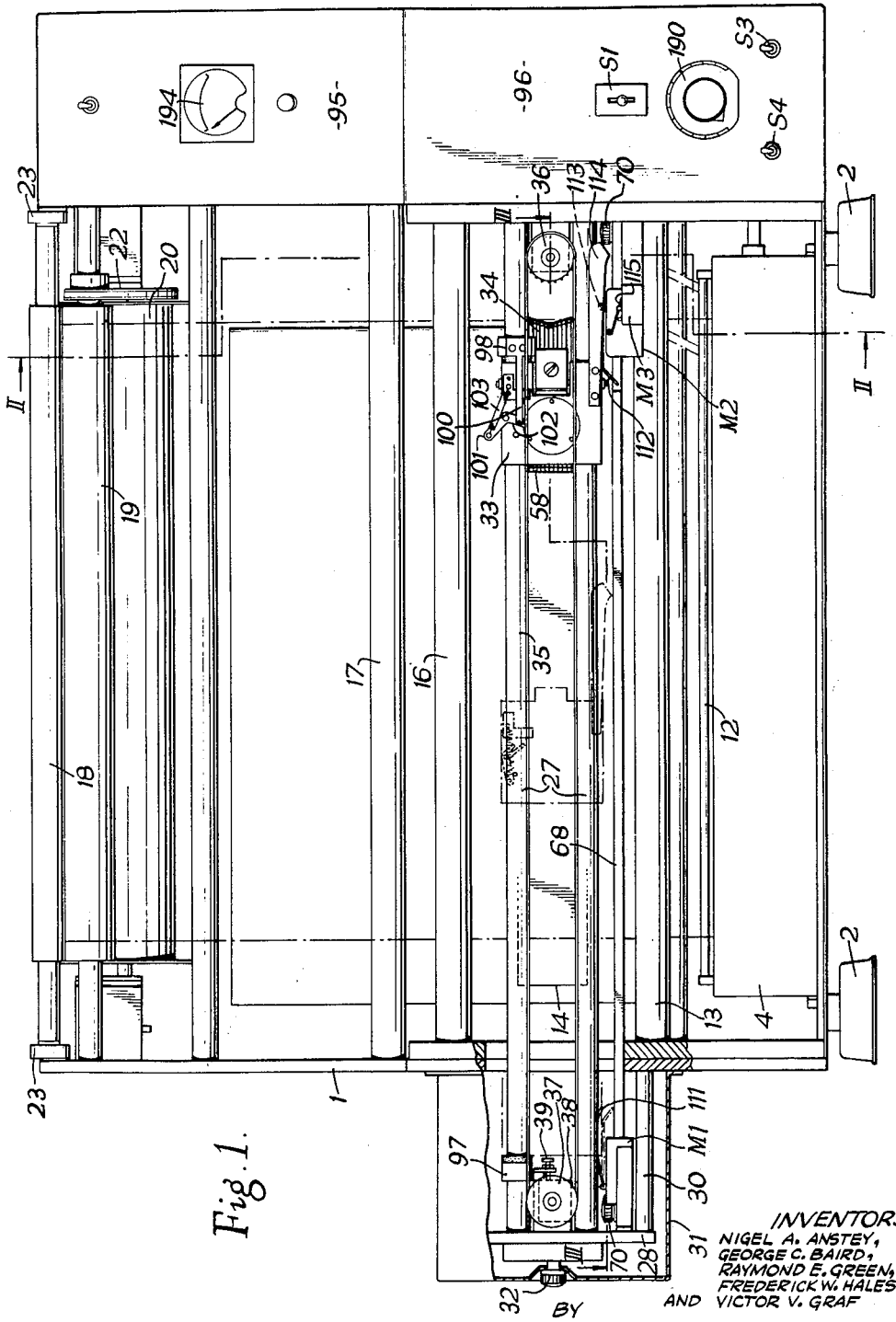
FIGURE 1 is a front view, partly broken away and in section, showing recording apparatus exemplifying the invention.
Figure 3:
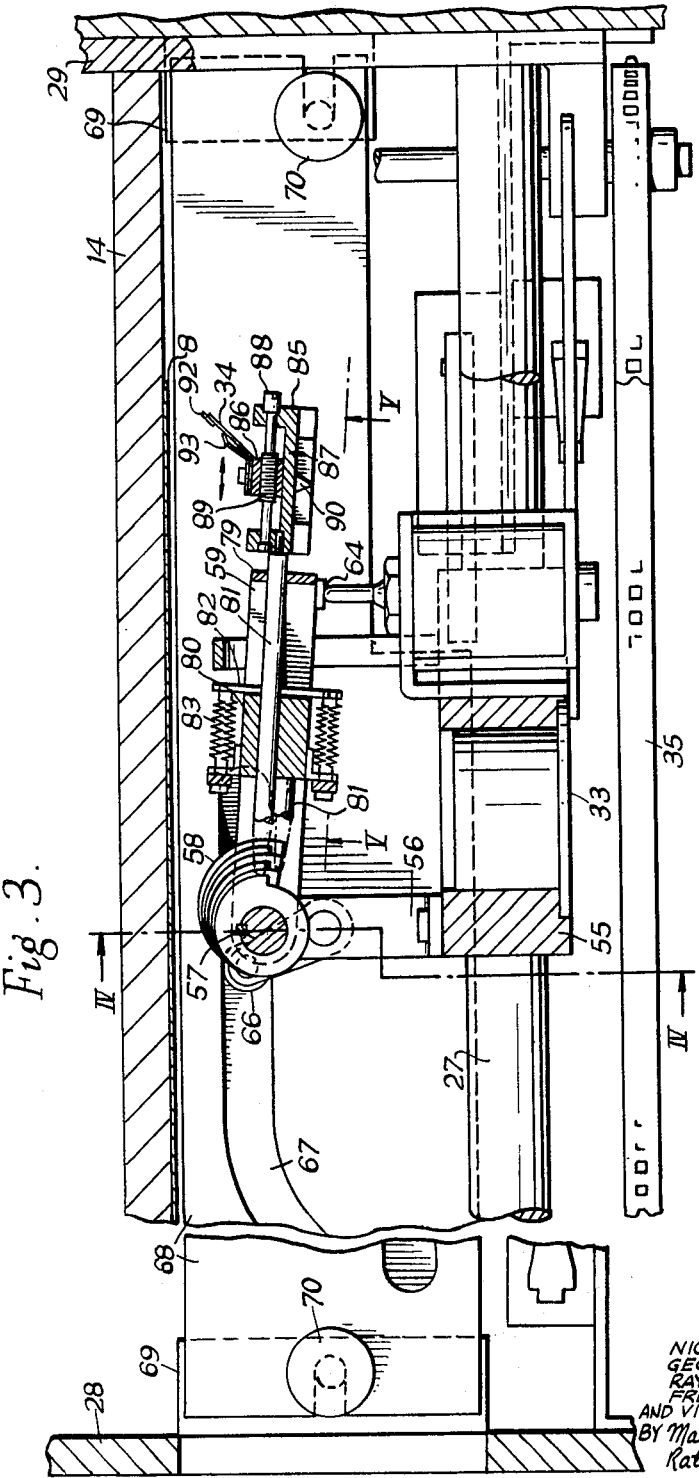
FIGURE 3 is a detail sectional view, partly broken-away and to a larger scale, taken on the line III—III of FIGURE 1.

Extending horizontally across the casing 1 in front of the back platen 14 are two guide rods 27 which are carried by fixed supporting plates 28 (FIGURES 1 and 3) and 29 (FIGURES 2 and 3). As shown in FIGURE 1, the plate 28 is mounted outside the main body of the casing 1 on pillars, such as 30, in order to provide accommodation for various switches to be described. This part of the apparatus is enclosed by a removable, substantially air-tight cover 31 which is secured in position by a holding screw 32.

Slidably mounted on the guides 27 is a recording carriage 33 carrying a number of recording pens 34, the construction and operation of which will be described in due course.

The carriage 33 is arranged to be driven to and fro along the guides 27 by means of a perforated steel driving band 35, which passes round a toothed driving drum or wheel 36 at one end of the apparatus and round a pulley or drum 37 at the other end. The pulley 37 is mounted on a bearing block 38 the position of which, and thus the tension of the driving band, can be adjusted by means of a screw 39.

The driving drum 36 (see FIGURE 2) is mounted on a shaft 40 which is driven from a synchronous electric motor 41 through a worm gear 42, a chain 43, an electrically operated clutch 44 and a change-speed gear, which is indicated at 45.

This gear comprises a series of three driving gear wheels 46, all of which are fixed on a shaft 47 driven from the clutch 44. It also comprises a series of three driven gear wheels 48 which are fixed on a sleeve 49. This sleeve is slidable longitudinally on the shaft 40, but is prevented from rotation on the latter by a pin 50 which is mounted on the shaft and which engages in a slot 51 formed in the sleeve 49. By sliding the sleeve 49 along the shaft 40, any selected one of the gears 48 can be brought into engagement with the corresponding one of the gears 46, in order to provide the required speed ratio. A spring-urged ball (not shown) provided in the sleeve 49 engages in one of a series of grooves 52 in the shaft 40 in order to retain the sleeve 49 and gears 48 in their adjusted positions.

Referring now to FIGURES 1, 3 and 4, the carriage 33 comprises a block 55 which slides on the guides 27. It carries a pair of brackets 56 in which a cam shaft 57 carrying a number of cams 58 is journalled. The shaft 57 also provides a pivotal connection between the brackets 56 and a pen carrier, indicated generally at 59. The latter is biased away from the platen 14 by means of a tension spring 60 (see FIGURE 4) which is connected at one end to a bracket 61 mounted on the carrier 59 and at the other end to a pin 62 mounted on the carriage block 55. The pen carrier 59 is, however, movable towards the platen 14, against the force of the spring 60, by means of an electromagnet 63, (FIGURE 4) the armature of which engages the carrier 59 at 64 (FIGURE 3), in order to bring the pens 34 into recording contact with the paper 8, which is in contact with the front face of the platen 14.

The rotation of the cam shaft 57, and with it the cams 58, during the travel of the carriage 33 along the guides 27 is effected by means of a crank arm 65 carrying a roller 66, which runs in a cam groove 67 cut in a cam, plate 68. This cam plate 68 is mounted on fixed brackets 69 mounted in the casing 1, to which brackets it is removably secured by means of dowel pins and nuts 70. When necessary, the cam plate 68 can readily be removed and replaced by another plate having a different form of cam groove cut in it. The cutting of the grooves of the required shapes can be effected very easily using a milling machine.

The crank arm 65, which is pivotally mounted on a pin 73 fixed to one of the brackets 56, carries on its hub 74 teeth 75 which mesh with and drive a gear wheel 76 which is fixed to the cam shaft 57. It will be apparent that as the carriage 33 travels to the left (FIGURES 1 and 3), which is the direction in which it makes its recording stroke with the pens 34 in contact with the paper 8, the crank arm 65 will be turned in an anti-clockwise direction (FIGURE 3) and the cams 58 in a clockwise direction. The effect of this on the positions of the pens 34 will now be described.

The pen carrier 59 comprises a pair of side arms 78 (see also FIGURE 5) which are connected by cross-members such as 79 and which carry between them a drilled and slotted insulating block 80. Slidably mounted in the holes in this block 80 are a number of pen rods 81, each of which bears at one end against one of the cams 58 and carries at its other end one of the pens 34. The number of pens, and thus the number of pen rods and cams needed, may be selected to suit particular requirements, but 12 are shown in FIGURES 4 and 5. For the sake of convenience, only one pen 34 is shown in FIGURE 3, together with two of the pen rods 81. As will appear from this figure, alternate pen rods 81 may be staggered in the block 80 but all the pens 34 are in line with each other for simultaneous engagement with the paper 8.

Each of the pen rods 81 carries a projecting pin 82, which is connected by means of a tension spring 83 with a fixed part of the pen carrier. The springs 83 maintain the pen rods 81 in contact with the cams 58, while the rods are prevented from turning by the slots 84 in which the pins 82 slide.

Each of the pens 34 is carried on a pen mounting 85 fixed to one of the pen rods 81. Each mounting allows of the initial adjustment of the pen position in a direction parallel to the pen rods. For this purpose, each pen is fixed to a block 86 which is longitudinally adjustable (but non-rotatable) in the U-shaped body 87 of the mounting 85 by means of an adjusting screw 88. This screw, which is turnable but not axially movable in the body 87, is formed with a threaded section 89 which screws in a threaded bore formed in the block 86. By turning this screw 88 the block 86 carrying the pen 34 can be moved in one direction or the other. A pointer 90 which is mounted on the block 86 and cooperates with a scale 91 (FIGURE 5) enables the position of the pen to be read off against the scale.

The pens 34 are made of strips of resilient metal and each pen is shown in FIGURE 3 as being provided with a tip 92 which is made of a hard metal. Rigid strips 93, which are secured to the blocks 86 in front of the pens 34 and against the ends of which the pens bear resiliently, maintain the tips of the pens in line with each other, and pretension the pens to a suitable pressure against the paper.

The pens 34 are arranged as close together as possible, while ensuring that they are insulated from each other, in order that the adjacent traces may be recorded on the paper 8 as close together as possible. To assist in this, strips of thin insulating material may be arranged between the pens in a similar manner to that which is shown in and which will be described with reference to FIGURE 9.

The pens 34 are connected individually to a series of pen amplifiers, which may be mounted in the back of the casing 1 in a compartment 94 (FIGURES 1 and 2) and which will be referred to again hereinafter. Other compartments at the side of the casing 1, behind panels 95 and 96 (FIGURE 1), accommodate other electrical components which will also be referred to hereinafter. For the sake of clarity, electrical connections have been omitted from FIGURES 1 to 5 of the drawings.

The travel of the carriage 33 along the guides 27 is limited by stops 97 and 98 fixed to the upper guide. Furthermore, in order to prevent the carriage from rebounding from the stop 98, the latter carries a pin 99 (FIGURE 4) which is fixed on an arm 100 projecting from the stop. A bellcrank lever 101 has a forked arm 102 which is pivoted to the carriage and is acted upon by a tension spring 103, which is also connected to the carriage. During the travel of the carriage the lever 101 occupies the position shown in broken lines in FIGURE 1, but as the carriage nears the stop 98 the forked arm 102 engages the pin 99, which forces the lever 101 past dead centre to the position shown in full lines. During this the action of the spring 103 is first to assist in stopping the carriage and then to oppose any tendency for it to rebound from the stop 98, or to be moved by the slight residual torque in the clutch 44 when the latter is unenergised.

The operation of the recording apparatus, including the travel of the carriage and the paper feed, together with the movement of the pens 34 into and out of engagement with the paper, is effected with the aid of a number of switches. These include, besides the switch 24 and others to be described, three micro-switches M1, M2 and M3 which are associated with and which are operated by the movement of the carriage 33.

The switch M1 is a single-pole change-over switch the operating arm 111 of which is arranged to be engaged by a projection 112 on the carriage 33 as the latter reaches the end of a recording stroke to operate the switch in one direction against the force of a spring. This spring returns the switch to its original position when the carriage starts its return travel. The operation of the switch M1 causes the pens 34 to disengage from the paper 8 and operates the clutch 44 and a relay R5 (FIGURE 6A) to stop and reverse the motor 41, as will be described more fully in due course.

The switch M2 is a similar single-pole change-over switch, the actuating arm 113 of which is operated by a projection (not shown) on the carriage 33 when the latter reaches the end of its return stroke. The switch M2 serves to stop the carriage by deenergising the clutch 44 and again reverses the motor 41, thereby leaving the apparatus ready to make another recording stroke.

The switch M3 is a single-pole, normally-open switch which is closed after the carriage 33 has travelled a short distance at the start of a recording stroke. This is done by the engagement of an arm 114 fixed to the carriage against the operating arm 115 of the switch. The purpose of the switch M3 is to fire the shot for direct recording when the carriage has reached its correct speed at the start of recording, as determined by the synchronous motor 41, and after the pens 34 have started to record.

Referring now to FIGURES 6A and 6B, which together constitute FIGURE 6 of the drawings, these show the electrical circuits which control the operation of the apparatus shown in FIGURE 1, together with parts of the pen amplifier and associated circuits. The various parts of the control circuits and their individual functions will be described first.

As will be seen, the circuits shown include the three micro-switches M1, M2 and M3, the paper motor 21 with its spider operating the switch 24, the synchronous carriage drive motor 41, the clutch 44, the back plate or platen 14, the pens 34 and the pen magnet 63, the energization of which latter brings the pens 34 into recording contact with the paper between them and the platen 14, all of which parts have already been mentioned.

The control circuits also include a number of relays R1, R2, R3, R4, R5, R6, R7, R8 and R9, a 3-position key switch S1, a 12-step solenoid operated "Ledex" cam-switch S2, a master on and off switch S3, an operating switch S4, paper motor switches and various other parts, certain of which are also indicated in FIGURE 1.

The control circuits are connected at 120 to a 12 v. D.C. supply through the master switch S3, the closing of which cause a pilot lamp 121 to light.

The switch S1 is a 3-position switch having three pairs of normally open contacts 122, 123 and 124. When the switch S1 is in its central or off position all its contacts are open. Its lower position is for manual control of the timing mechanism (described later), in which position the contacts 123 and 124 are closed. Movement of the switch to its upper ("Auto") position causes closing of the contacts 122 and provides for automatic operation of the timing mechanism, as will be described.

The switch S2 is a 12-position step switch the winding of which is indicated at 125. The switch includes two pairs of normally open contacts 126 and 127 and a pair of normally closed contacts 128. The contacts 126 and 127 are closed and the contacts 128 are opened when the switch reaches its 12th position by the action of a cam 129 which is notched forward by successive energisations of the winding 125.

130 is a pilot lamp which is caused to light either by the closing of the contacts 124 of the switch S1, when the latter is moved to its manual position, or by the closing of the contacts 127 when the switch S2 reaches its 12th position. In the latter case, the light indicates that an automatic timing sweep is about to take place, as will be described later.

The contacts 128 provide a connection between the switch M3 and a terminal 131, which in use is connected to shot firing apparatus so that, except when the switch S2 is in its 11th position, closing of M3 fires the shot.

The switch S4 is a spring-controlled normally-open operating switch, the closing of which causes the energisation of the relay R1 and the lighting of a pilot lamp 134, providing that the micro-switch M2 is in its normal position as shown. This causes the closing of the contacts 135 of the relay R1, which is thereby rendered self-holding.

Instead of using the switch S4, to operate the apparatus as will be described, the same action may be effected from a distance using a switch line (not shown) which is plugged into a jack 136. Closing a switch or relay connected in this line energises the relay R7 and closes the contacts 137 of the latter, which are in parallel with the switch S4.

The relay R2 includes three sets of triple changeover contacts 138, 139, and 140, which normally occupy the positions shown, with the lower pair of contacts of each set closed and the upper contacts open. The effect of this, assuming that the relay R1 has been energised, is to connect the 12 volt supply to the micro-switch M3, through the lower contacts 138, to the winding of the relay R4, through the lower contacts 139 and through an adjustable series resistance 141, and to one of the normally-open contacts 142 of the relay R4, through the same contacts 139. It also connects the clutch 44 through the lower contacts 140 to the normally-closed contact 143 of the micro-switch M1, the normally open contact 144 of which is connected to the winding of the relay R2 and to the upper normally open contact of the set 138 of the latter.

The lower normally closed contacts 140 of the relay R2, in series with the normally closed contact 143 of the switch M1, complete the energising circuit of the clutch 44, so that the latter is engaged immediately the operating switch S4 is closed or the relay R1 is otherwise energised. The same action also causes energisation of the relay R4 and produces energisation of the pen magnet 63, thus bringing the pens into engagement with the paper.

Energisation of the relay R2 is effected, when the carriage 33 completes a recording stroke, by the movement of the centre contact of the switch M1 away from the contact 143 into engagement with the contact 144. The result of this energisation of R2 is to cut off the 12 v. supplies to the switch M3 (which prevents the transmission of a further shot-firing signal by the closing of M3 during the return travel of the carriage), to the relay R4 and to the pen magnet 63 (which causes the pens to be raised from the paper, and, briefly, to the clutch 44), but this latter circuit is then recompleted by the engagement of the upper contact of the set 140. The closing of the upper contacts 138 renders the relay R2 self-holding.

The closing of the upper contacts of the set 139 energises the relay R5 through a variable series resistance 145, which in conjunction with a capacitor 145a provides a slight time delay and assists in the operation of the relay R3.

The relay R5 is a reversing switch for the synchronous motor 41. This latter is energised through an inverter, indicated generally at 146, which is supplied at 147 with a 50 cycle supply. The inverter 146, the circuit and operation of which will not be described in detail, since they are known in principle, includes in its circuit an overload relay 147 the contacts 148 of which are connected to earth in series with the normally closed contacts 149 of the relay R6 and with the lower normally closed pair of contacts 150 of the relay R3.

The relays R3 and R6 have as their primary purpose the stopping of the motor 41 at the end of the travel of the carriage when making its recording and return strokes respectively.

The winding of the relay R3 is connected between the normally open contacts of the set 139 of the relay R2 and a condenser 152 of large capacity (2,000 mfd.), the other side of which condenser is connected to earth. When the relay R2 is energised, the condenser 152 is charged through the winding of R3 and the charging current operates the latter. The effect of this is to open the lower normally closed contacts 150 and to connect the normally open contacts 153 and 154 of this relay R3 to earth.

The closing of the contact 153 completes the circuit of the paper feed motor 21, providing that a switch 154a in series with the former is closed, as it is during normal recording, and in spite of the switch 24 being open, as it is after the completion of each paper feed. The closing of the contact 154 allows current to pass through the winding 125 of the switch S2 (assuming that the key switch S1 is in its "Auto" position with the contacts 122 closed) and thereby moves the cam 129 of S2 through one step.

Once the condenser 152 has charged, current ceases to flow through the relay R3, thus allowing the latter to return to its normal position. By this time, however, rotation of the spider 25 will have allowed the switch 24 to close, so that the paper feed motor 21 still continues to operate until the switch 24 is again opened by the spider 25. This will occur when the paper has been fed forward sufficiently to bring a fresh area into position for recording.

The condenser 152 will be kept charged so long as the relay R2 is energised. When, however, the carriage reaches the end of its return stroke and operates the switch M2, thus transfering the switch arm of M2 from the contact 156 to the contact 157, the result will be to connect the winding of the relay R6 to earth and to be de-energised the relays R1, R2, and R4. De-energisation of R2 will cut off the 12 volt supply from the condenser 152. As a result the condenser 152 will discharge through the winding of R6 and will operate this relay so as to open the contacts 149 and stop the motor 41 for a short time, that is until the condenser 152 has discharged. By this time, the relay R5 will have operated to reverse the motor connections, so that the latter will restart in its reverse direction, that is in the direction to cause the carriage to make a fresh recording stroke when the clutch 44 is next engaged.

Referring now more particularly to FIGURE 6B, this shows the twelve pens 34, the platen 14 and the pen magnet 63. Each of the pens 34 is connected individually through one of a bank of pen compounding switches, indicated generally at 170, with its pen amplifier. Eleven of these amplifiers are indicated generally in block form at 171, but one of the amplifiers (that for pen No. 6) is shown in greater detail at 171–6. As will be seen from the drawing, the amplifiers 171, all of which are similar, can be of simple design and their circuits will not be described in detail, except to mention that the reference 169 indicates a stabilising cell for establishing grid bias on the first valve of the amplifier, while 172 is a variable resistance the adjustment of which varies the bias current of the last valve of the amplifier and thus the recording current through the paper.

When recording a seismic survey, the outputs of the amplifiers of the twelve geophones or groups of geophones used are supplied to a bank of terminals 173, which latter are individually numbered in the drawings to correspond to the pen amplifiers 171 to which they are connected. The connections of the first five and the last five of the terminals 173 to the pen amplifiers numbered 1 to 5 and 8 to 12 are direct, although for the sake of clarity only the first five connections are shown in the drawings, but the connections to the sixth and seventh pen amplifiers 171–6 and 171–7 are taken through two upper pairs of normally-closed contacts 174 and 175, respectively, of the relay R8. When this relay is energised, as a result of the operation of the switch S2, in a manner which will be described, the pen amplifiers 171–6 and 171–7 will be disconnected from the geophone amplifiers and will be connected instead to a standard frequency supply through the normally-open contacts 176 and 177 and through a potential divider indicated at 178.

The object of this is to provide on the record sheet 8 an accurate time record, which is preferably done automatically after the carriage has made a predetermined number (such as 11) normal recording sweeps. This is done in the apparatus described by the action of the cam 129 of the switch S2. The pens used for making the timing trace are preferably those which have very small dynamic corrections applicable to them, i.e. those corresponding to the geophones nearest the shot, which in the present case are the pens connected to amplifiers Nos. 6 and 7.

If desired means can be provided for producing a

"blip" on one or more of the traces at the moment when the shot is fired by the closing of the shot-firing switches M3; thus a network 179 can be used to apply this "blip" to the amplifier 171–6.

FIGURE 6B shows at 181 a frequency divider the circuit and operation of which will not be described in detail, since they are of a known type. The frequency divider 181 is supplied at 182 with a standard frequency 100 cycle input which may be obtained from any suitable source, such as for example one controlled by a tuning fork. An alternative arrangement is shown in and will be described later with reference to FIGURE 7 of the drawings.

The 50 cycle output from the terminals 183 of the frequency divider 181 is supplied to the potential divider 178 and thence to the sixth and seventh pen amplifiers 171–6 and 171–7 when the relay R8 has been operated and a timing trace is to be recorded. Its action is thus to produce a pair of 50 cycle time bases on the paper.

The amplifiers 171–6 and 171–7 operate whether a seismic recording or a time signal are being recorded and their high tension supplies, as well as that of the frequency divider 181, are derived directly from a 230 volt line 184. It is, however desirable to ensure that when a time base is being recorded through the amplifiers 171–6 and 171–7 the remaining pens should not be operative to record any outside signals which might reach them through the other amplifiers. This is ensured by the relay R9 which, in its normal position in which its upper contacts 185 and 186 are engaged, connects the line 184 to the anode circuits of amplifiers Nos. 1 to 5 and 8 to 12 through a common line 187. It being noted here that, for the sake of clarity, the connections between the line 187 and amplifiers Nos. 1 to 5 have been omitted from the drawing, although these connections are, in fact, similar to those of amplifiers Nos. 8 to 12, which are shown.

When the relay R9 is energised, which occurs simultaneously with energisation of the relay R8, the high tension supply is cut off from amplifiers Nos. 1 to 5 and 8 to 12 and the anode circuits of these amplifiers are connected to earth through the contact 186 and a normally-open contact 188.

Energisation of the relays R8 and R9 is effected by the closing of the contact 127 of the switch S2, which may be arranged to take place at the twelfth position of the switch after eleven seismic recordings have been made.

Referring again to the pen circuits, it will be seen that each of the pens 34 is connected to one of the contacts of a rotary switch 190. Each pen is also connected through one of a series of switches (or plug and socket contacts) 191 with a shunt resistance 192. The other ends of the resistances 190 are connected to the platen 14. It will be apparent, therefore, that when any of the switches 191 is closed the corresponding resistance 190 is connected between the corresponding pens 34 and the platen 14 in parallel with the circuit through the recording paper. This reduces the recording current and the intensity of recording. These shunt resistances are used when the apparatus is being employed for compositing, that is for recording one signal (or a fraction thereof) on another, as will be described.

The arm 193 of the switch 190, which is normally left in the position shown, is connected to a milliammeter 194, which latter is connected to earth through a series resistance 195. The switch 190 and the meter 194 are used when checking and setting up the apparatus.

It is important that the timing traces made on the paper should be accurate, which requires that the frequency of the 100 cycle supply to the frequency divider 181 should be exact. As has been stated, this may be done by obtaining the supply from a fork controlled or other suitable outside source. When the apparatus is used for re-recording from a magnetic record, the frequency standard may be obtained from a fork controlled unit included in the magnetic recording and play back apparatus, or even from the magnetic tape itself.

Alternatively, a separate frequency standard may be provided, either as part of the apparatus or as a separate unit, for connection to the latter. One suitable arrangement is shown diagrammatically in FIGURE 7.

The standard is obtained from a 10 kc./s. crystal controlled oscillator and maintainer unit 201, which may be of any standard type. The output from this unit is passed through a series of frequency dividers which may take the form of standard decade scalers.

As shown in FIGURE 7, the output which is used for the timing traces is passed in turn through three units 202 ($\div 10$), 203 ($\div 10$) and 204 ($\div 2$), which together reduce the frequency to 50 cycles. The unit 204 would take the place of the unit 181 shown in FIGURE 6B, the output line 205 being connected through the relay R8 to the amplifiers 171–6 and 171–7 when a timing trace is to be recorded.

It would constitute an additional advantage to provide 5 c.p.s. and 1 c.p.s. blips, in addition to the 50 cycle timing trace. This may be done by using two further decade units 206 ($\div 10$) and 207 ($\div 5$). The 5 c.p.s. and 1 c.p.s. outputs of these units, delivered through lines 208 and 209 respectively, may be supplied separately to different pens through the amplifiers 171–6 and 171–7, or they may be superimposed on a common timing trace.

The origins of the 5 c.p.s. and 1 c.p.s. "blips" may be made to coincide with the firing of the shot by the closing of M3. Alternatively if a weight-dropping or thumping technique is being employed the origins may be initiated by the dropping of the weight at an appropriate point in its travel. In either case the scale-of-ten, scale-of-two, and scale-of-five dividers are pre-set to nine, one and four, respectively, and the counting is triggered by the closing of M3.

When re-recording from a magnetic record the origins may be derived from a signal indicating the time of firing.

The supply to the inverter 146 which feeds or at least controls the speed of the motor 41 may be derived from or controlled by the same frequency standard as the timing trace, for example by using a fork controlled supply. Another arrangement makes use of the same crystal controlled frequency standard 201 as shown in FIGURE 7.

The output from the unit 201, after passing through the unit 202, has its frequency reduced by 10 and by 2 by units 210 and 211. The 50 cycle output from the unit 211 is supplied to a power amplifier 212 the output of which drives the motor 41.

The use of the apparatus which has been described with particular reference to FIGURES 1 to 6 will now be described as applied to the making of a direct seismic recording.

The first step necessary is to prepare and set up the recording apparatus to suit the conditions of survey and to provide the required static and dynamic corrections.

The shape and dimensions of the individual cams 58, the gearing 75 and 76 and the form of the velocity function cam groove 67 in the plate 68 can be calculated from the appropriate data. Thus, considering the case of a number of geophones which are spaced horizontally from the shot point, let:

$x =$ the horizontal distance of a geophone from the shot point;

$V =$ the average velocity of signals down to and back from a reflecting layer at a particular depth;

$t =$ the time taken by a reflected signal between the firing of a shot and the receipt of the signal by the geophone;

$dt =$ the spread correction required.

Now:

$$dt = \frac{x^2}{2V^2 t}$$

to an adequate approximation.

This is a parabola for any one reflection. For an early reflection, that is one coming from a shallow reflecting layer and having a short travel time $t$, the curve showing the spread corrections for the different geophones will be in the form of an acute parabola, but for deeper reflecting layers the curve will flatten out rapidly, although still remaining parabolic in form.

It will be appreciated, of course, that when calculating the forms of the cams 57 and of the cam grooves 67 allowance must be made for the arcuate path, relative to the carriage which is followed by the roller 66 on the crank arm 65. Allowance must also be made for any effect between the lines of action of the pen rods and the axis of the camshaft.

For a predetermined spacing and distribution of the geophones, the required spread corrections can be provided using a standard set of cams on the camshaft, but in order to allow for variations in the velocity V, a separate plate 68 having an appropriately cut groove 67 must be prepared or selected for each survey. It has been found possible to cut the calculated grooves in suitable plates, made for example out of aluminium, simply and inexpensively using standard types of engraving machines.

The static corrections are made when setting up the apparatus, prior to recording, on the basis of the information available about the area being surveyed. This includes particularly surveyor's elevation reports (or surveyed depths of water, in the case of marine surveying).

The static corrections are applied to the individual pens by adjusting the screws 88 and using the scales 91. Alternatively, a separate template or jig might be used for making the adjustments. It is an important and valuable feature of the present invention that these static corrections can be introduced independently of the means used for making the dynamic corrections, since this very greatly simplifies the latter and reduces the cost and complexity of the apparatus.

The geophones are connected to individual geophone amplifiers of any suitable type, and the outputs of these amplifiers are each connected to one of the terminals 173 and to the platen 14, so that when the carriage 33 is moved across the width of the paper variable density lines or traces are recorded on the paper. The densities of the lines vary in accordance with variations in the amplifier outputs, the traces being of uniform width.

Any suitable filters may be included in the geophone amplifier circuits for the purpose of modifying the waveforms of the signals and reducing the effect of interference or noise.

Each of the pen amplifiers 171 is so designed and adjusted by means of its variable resistance 172 that when no signals are being received by the amplifier, the steady standing bias current in the output valve produces a trace of a uniform medium density. When a signal is superimposed on the bias current, the peaks in the signal increase the density of the trace while the troughs decrease it. The amplitude of the signal output is so adjusted in relation to the bias current that the variation in density is from very dark almost to clear white, when very strong reflected signals are received. Any one reflection, therefore, appears on the trace as a series of perhaps two or three light and dark striations, these being dependent to some extent on the settings of the filters used in the geophone amplifiers (not shown).

The speed of the carriage is set by means of the gear 45, the speed selected being chosen according to the recording time required. The gear may be designed to provide recording times of 2.6, 3.2 and 4 seconds, to give particular examples.

The recording apparatus is connected to the necessary sources of power, including a 12 volt supply for the various relays. The 50 cycle supply for the motor 41 may be separate from or associated with the standard frequency supply, as has been mentioned. High tension and heater supplies will also be required for the valves of the amplifiers 171 and the other parts of the apparatus, including the inverter 146 and the frequency divider 181.

The switch S1 is set to "Auto" and the switch 154a is closed. The switches 170 are all closed and the switches 191 are open. The other parts of the apparatus will be in the positions shown in FIGURE 6. The carriage 33 will be at the right hand end of its stroke with the pens 34 raised clear of the platen 14, the clutch 44 will be free and the motor 41 will be running in the forward direction, ready to make a recording stroke. The switch 190 is in its off position, as shown.

A roll 6 of electro-chemical or electrolytic recording paper (which may be of the kind which is supplied moist) is inserted in the magazine 4 and its end is drawn up and over the platen 14 and is attached to the roller 20.

When a shot is to be fired, a fresh moist section of the paper 8 is drawn from the magazine 4 into position against the platen 14 by operation of switch 155.

The shot firing terminal 131, which is connected to the contact 128 of the switch S2, is connected externally to a high-speed or gas-filled relay (not shown) the closing of which effects the firing of the shot when the switch S3 is closed.

To make a recording, the operating switch S4 is closed (or the same effect may be produced by closing a switch connected to the jack 136). This causes the relay R1 to be closed and it is held closed by the closing of the contacts 135. It also causes the 12 volt supply to be conveyed through the closed contacts 138 to the switch M3, which is still open, and to the clutch 44 through the contact 143 of the switch M1 and the closed contact 140. This will cause the clutch 44 to engage, as a result of which the motor 41 will start to drive the carriage 33. The 12 volt supply will also be conveyed to the winding and contacts of the relay R4. After a short delay, adjustable by the resistance 141, the contacts 142 will close and effect energisation of the pen magnet 63 thus causing the pens 34 to be brought against the paper 8.

After the carriage has travelled a short distance, it closes the switch M3, thereby firing the shot. The signals produced, after transmission through and reflection in the ground, are picked up by the geophones and after amplification and any necessary filtering in the geophone amplifiers, they are fed to the twelve pen amplifiers 171 and thus to the pens 34. At this time, the switch S2 is in the first of its 11 positions, with the contacts 126 and 127 open and the contacts 128 closed, and the relays R8 and R9 are de-energised. Thus, it is the geophone signals which reach the amplifiers 171–6 and 171–7 and not a timing signal.

The carriage 33 travels across the paper and as it does so the pens record visible traces on the latter, the densities of which traces are modulated in accordance with the signals received by the geophones, subject to modifications in the wave form of these signals produced by the filters and to the effect of the bias current in the pen amplifiers 171.

The magnitude of the signal current superimposed on the steady bias current may be adjusted. If it is small, the density of the recorded trace will be proportional to the signal voltage and thus the record will show the signal amplitude faithfully, together with the alignment of the antinodes of the wave forms.

If, on the other hand, the amplitude of the signal voltage is set large, then the intermediate density tones are lost and everything in the record trace will be either light or dark. Such a record will not give information on the signal amplitude but it will show clearly the alignment of the nodes.

Both methods are useful, but the second has the feature that the superimposition of high-frequency noise on the reflection wave form does not affect very much the timing of the nodes (unlike the antinodes) and hence the filtering which is necessary in the geophone amplifiers may be less.

This is a good thing from the point of view of obtaining good resolution. The second method also has the advantage that distortion of relative amplitudes due to the automatic gain control system in the geophone amplifiers is of no consequence.

With the travel of the carriage 33 across the paper, which is exactly proportional to time, the pens 34 will be moved individually in the pen block by the action of their individual cams 58 and of the velocity function groove 67 in the plate 68. This movement introduces separate dynamic corrections into the individual records. The corrections are different for the different geophones, according to the distances of the latter from the shot point, and vary with time, being progressively reduced with the elapse of time after the firing of the shot, in accordance with the depth of the reflecting layer, as calculated for the increasing travel time of a signal reflected from it.

As the carriage 33 nears the end of its recording stroke it operates the switch M1, which is changed over from the contact 143 to the contact 144. This causes energisation of the relay R2 and also momentary disengagement of the clutch 44, until the upper contacts of the lower set 140 of the relay R2 engage. The relay R2 is rendered self-holding by the closing of the upper pair of contacts 138.

The operation of the relay R2, by opening the lower pair of the contacts 139, cuts off the supply to the relay R4, and to the pen magnet 63, thus causing the pens to leave the paper. Furthermore, by the closing of the upper two contacts, 139, it first energises the relay R3, as a result of the condenser 152 charging, so that the opening of the contacts 150 stops the motor 41, and then, after a short delay due to the resistance 145, it energises the relay R5 which reverses the direction of the motor 41.

The closing of the contacts 153 of the relay R3 starts the paper feed motor 21, the running of which is then maintained by the closing of the switch 24 (previously held open by one of the arms of the spider 25) until the switch 24 is again opened by the spider 25, by which time the correct amount of paper feed has been effected and the motor 21 stops. The energisation of the relay R3 will by this time have terminated owing to the charging of the condenser 152.

The closing of the contacts 150 will also have caused the motor 41 to start driving the carriage 33 in its return direction, which will continue until the carriage operates the switch M2. The start of this return travel will allow the switch M1 to return to its position shown, against the contact 143, but the relay R2 will remain held owing to the closing of its upper contacts 138. The opening of the lower of the contacts 138 will prevent the completion of a shot firing circuit when the switch M3 is operated by the carriage during its return travel.

As the carriage 33 complete its return stroke it operates the switch M2 away from the contact 156 and over to the contact 157. This will cause de-energisation of the relays R1, R2 and R4, but the relay R6 will be energised briefly to open the contacts 149 as a result of the discharge to earth of the condenser 152.

The opening of the contacts 149 will interrupt briefly the supply to the motor 41, while the de-energisation of the relay R2, and consequently of the relay R5, will reverse the connections to the motor 41. This will cause the latter to restart in its forward direction. The apparatus will thus be left ready to make a fresh recording stroke with a fresh section of paper in front of the platen 14.

The next shot is fired by closing the switch S4 and the entire operation is repeated as previously described.

Each time a recording stroke is made the cam 129 of the switch S2 will move forward one step and it is arranged that after 11 steps have been made the cam will operate the contacts 126 and 127 to close them, while at the same time opening the contacts 128. This latter makes it impossible for the next closing of the switch M3 to fire a shot if one should be connected.

The closing of the contacts 127 will cause the relays R8 and R9 to be energised, as a result of which the pen amplifiers 171–6 and 171–7 will be disconnected from the input terminals 173 and connected to the frequency divider 181, while the high tension supplies to all the amplifiers except 171–6 and 171–7 will be cut off.

As a result, the next stroke of the carriage 33, will be a timing stroke, which will be carried out in the manner already described but without the firing of a shot, and the two pens connected to the amplifiers 171–6 and 171–7 will record a pair of time traces on the paper. After this recording, the motor 21 will automatically feed a fresh section of paper in front of the platen 14, while the switch 129 will be brought into its original or first position with the contacts 126 and 127 open and the contacts 128 closed. The relays R8 and R9 will be de-energised and the apparatus will be ready to make a fresh recording stroke.

If the switch S1 is switched to "Manual" instead of "Auto," thus opening the contacts 122 and closing the contacts 123 and 124, a timing sweep is obtained immediately. This is, therefore, useful at the start of a recording session, or when circumstances dictate grouping of the records in numbers of other than eleven.

Various types of variable density recording paper or other material may be used. One suitable material consists of a paper base impregnated with a solution of potassium iodide, cadmium iodide, zinc iodide, formaldehyde and starch.

Various modifications are possible in the recording apparatus which has been described.

One modification consists in replacing the single metal backing plate or platen 14 by one which is divided into a number of separately insulated strips, one for each trace. These strips are connected individually to the various pen amplifiers. With this form of backing plate it is not necessary for the pens 34 to be insulated from each other but they can be connected to the amplifiers 171 by a common lead.

Instead of using a perforated steel band 35 which is permanently connected to the carriage 33 and which is driven through a disengageable electric clutch 44, it would be possible to employ a steel sprocket chain as the driving band, which chain is trained about sprocket wheels corresponding to the wheels or drums 36 and 37. One of these sprockets would be driven continuously at an accurately controlled speed by means of the motor 41, if necessary through a change speed gear such as 45. Each of the clutches would take the form of an electromagnet having a fixed core, the end of which core projects from the magnet winding close to one of the runs of the chain. The projecting end of the core would be so positioned and shaped that when the electromagnet is energised the chain is attracted to the core, the end of which latter engages between the links of the chain. This provides a positive driving connection between the chain and the carriage. This connection is released when the electromagnet is de-energised.

Other forms of coupling between the driving band and the carriage could also be used. For example, the electromagnets could be provided with movable cores which are themselves movable into and out of engagement with the driving chain or which operate separate members which engage the chain. Alternatively, a small motor mounted on the carriage could be fitted with gearing engaging finally with a rack which is fixed in relation to the body of the machine.

Instead of using the recording apparatus of the invention to record direct from seismic signals received by geophones it may be used to produce variable density records from a previously made magnetic or other recording. In this case, the starting of the carriage can be effected by means of a time break signal of suitable amplitude which is derived from the magnetic or other record and which corresponds to the time of the firing of a shot, or to a predetermined interval before this time. This signal may be caused to operate the relay R7 directly or through the intermediary of another relay. For this operation it is important to use a clutch 44 of the kind which produces a rapid starting of the carriage with a degree of slip which is as nearly constant as possible at each operation.

When shots have been fired at different depths, it is necessary to introduce the necessary depth corrections, which may be done by including a suitable delay circuit between the time break output of the magnetic recorder and the relay R2 the operation of which starts the motor 41. One particularly suitable form of delay circuit is provided by an arrangement similar to that shown in FIGURE 7, which comprises a standard frequency oscillator unit the output frequency of which is reduced in stages by passage through a series of frequency dividing units and the final output of which is fed to a decade selector and an electronic gate unit. The operation of the latter causes the clutch 44 of the recorder to be energised after an accurately known time delay. The length of the delay can be varied by adjusting the settings of the decade selector units.

The units used in the time delay circuit may be of the transistorised type, such as are supplied by Venner Electronics Ltd. of New Malden, Surrey, England.

When re-recording from magnetic records it is possible to introduce the necessary static and dynamic corrections between the magnetic recording and the variable density recording by means included in the magnetic play back device, instead of in the variable density recorder. This may be done by varying the relative positions of the reproducing heads of the magnetic play back device. Static corrections may be set initially by individual adjustments applied to the head, before replay, while dynamic corrections may be introduced during replay by means of a series of cams acting on the individual heads.

If variable density recording is being effected by playback from a magnetic play back device, such as that mentioned above, which can apply both to static and dynamic corrections, then it becomes possible to use a variable density recorder which is not provided with its own correcting means. In this case, the variable density recorder can be constructed so as to include only a single broad pen or stylus (instead of a series of individual pens), in conjunction with a laminated backing plate or platen, that is one which is divided into a number of separately insulated strips, one for each trace, such as is referred to above. With this arrangement, it is easy for the traces to be recorded as close together as may be required and there is no difficulty in providing for the simultaneous recording of 24 or even more traces.

When a single recording pen is used, this may consist simply of a sheet of metal, such as beryllium copper, having one edge bent over to engage the paper. This edge may be provided with an elongated "nib" made of iridium or other suitable material.

Alternatively, a long needle roller could be used as the recording stylus or pen.

In certain cases, particularly when re-recording from an existing magnetic or other record, it is possible to dispense with either the static correcting means or the dynamic correcting means or both these means, in the variable density recorder. This applies if some or all of the necessary corrections have been introduced into the signals being recorded, which may, for example, be done in the magnetic recording and play-back apparatus during play-back. FIGURES 8 and 9 of the drawings show certain modified forms of pen carrier which take this into account.

Referring first to FIGURE 8, this is a detail view showing part of a pen carrier 159 which is similar to the pen carrier 59 shown in FIGURES 1 to 5. One of its side arms 178 is shown, together with a cross member 179 and an insulating block 180 with its slots 184, all these parts being identical in construction to the parts 78, 79, 80 and 84 respectively of FIGURES 1 to 5. FIGURE 8 also shows one of the pen rods indicated at 181, with its pin 182, while one of the cams 58 is also indicated in FIGURE 8.

In the pen carrier shown in FIGURE 8, however, the means for introducing static corrections have been omitted and the pens, one of which is indicated 134, are mounted directly on the ends of the pen rods 181.

FIGURE 9 illustrates other modifications which may be made in the pen carrier. One of these modifications is applicable to pen carriers which provide both for static and dynamic corrections, such as that shown in FIGURES 1 to 5, while other modifications provide for a pen carrier which allows for the making of either static corrections or dynamic corrections, but not both.

In FIGURE 9, one of the side arms of the carrier is indicated at 278. An insulating block 280, similar to the blocks 80 and 180, is secured to it and also to the other side arm (not shown), while part of a cross member connecting the side arms is shown at 279.

The pen rods, one of which is indicated at 281 and carries a pen 234, are also similar to those of FIGURE 8.

In the case in which only static corrections are required, the pen rods 281 are engaged, not by the cams 58 which are omitted, but by adjusting screws 290 which are screwed in tapped holes in the cross member 279. By adjusting these screws any necessary static corrections can be introduced.

If it is desired to provide for dynamic but not static corrections, the cross member 279 and the screws 290 are omitted and the pen rods 281 are engaged and operated by the cams 58.

As has been mentioned previously, it is desirable that the traces of the records produced should be spaced closely together, which involves certain practical difficulties when separately insulated pens are used. In order to enable very close spacing to be obtained, without the risk of contact between the pens, a pen comb may be provided in the form of a grid made, at least partly, of insulating material.

FIGURE 9 shows such a pen comb, which is indicated generally at 301. It comprises a series of insulating strips 302 which may be made of very thin material, perhaps only about 0.005 inch thick. The ends of the strips 302 are clamped between blocks 303 and the assembly is clamped together between side pieces 304 by means of bolts 305. The resulting pen comb is secured by brackets 306 to the side arms 278 of the pen carrier.

It will be seen that the use of thin strips 302 permits very close spacing of the pens 234, while preventing any electrical contact between them.

The pen comb 301 can be incorporated in the construction of the carrier 59 shown in FIGURES 1 to 5.

For the variable density recording apparatus which has been described to be used for compositing in order to produce a composite record from a number of superimposed signals, the first requirement is that the apparatus should be able to record in succession a number of signals along common tracks. This is provided for by the switch 154a the opening of which renders the automatic paper feed mechanism inoperative. The indexing will then be effected manually by operation of the paper feed switch 155.

Another important requirement is the provision of means for reducing the density of recording during the recording of each individual signal or combination of signals, which can be effected by producing proportional reductions in the recording currents. This can be done by closing the appropriate switches 191 so as to connect the resistances 192 in parallel with the paper resistance, that is between each pen 34 and the platen 14. If, for example, each shunt resistance 192 is made equal to the paper resistance (which may be about 3,000 ohms) the current through the paper will be reduced by half, while if the shunt resistance is half the paper resistance then the paper current will be reduced to one third.

While it would be possible to use variable shunt resistances, suitably calibrated, in place of the single fixed resistances 192, it is preferred to use a switch-controlled stepped resistance or combination of resistances, in order to produce a stepped control of the current corresponding to a series of fractional reductions such as one-half, one-third, two-thirds and so on. Alternatively, plug-in resistance units of suitable value could be employed in conjunction with sockets at 191.

It will be appreciated that the proportional reduction of signal required for each recording will depend on the total number of signals which are to be superimposed and on the sequence of the stages in which the signals are being combined, if this is being done indirectly in stages. If, for example, three signals are being superimposed directly, either during surveying or by play-back from individual magnetic records, each signal needs to be reduced to one-third of its normal recording value.

If, however, the procedure adopted is to combine two of the signals while recording on a magnetic record and then to superimpose the third signal on the variable density recorder, the density during the first variable density recording must be two-thirds of the final maximum required, in order that each of the first two signals may represent one-third of the final recording, while the third signal must be recorded at half the strength of the combined two signals, in order that it also may represent one-third of the total record.

Instead of using shunt resistances, other means, such as potential dividers, may be used for reducing the signal currents.

It may be noted that the use of shunt resistances is only practicable when the paper resistance is known and is reasonably constant and when this resistance represents only a small faction of the total resistance of the circuit. When the type of valve amplifier is used this circuit will be the cathode circuit of the last valve.

Whichever method is used separate, but simultaneously operated current controls should be provided for the different pens, assuming that all the pens are to be used for recording. It may, however, be remarked here that, when re-recording from magnetic or other records, it is possible to do all the recording using only a single pen. This renders possible, and in some classes necessary, certain modifications of the apparatus which has been described. Certain of these have been mentioned and others will be referred to hereinafter.

It is also possible to provide means for separately reducing the signal currents and the standing medium-tone currents used for recording. The signal currents may be reduced by any standard method of variable gain control, while the standing currents may be reduced by changing the supply voltage or other operating conditions (e.g. the bias conditions) of the last valve of the pen amplifiers.

Other methods of control, which will be described, may be used when the pens are supplied from a transistorised unit.

When compositing is being effected directly in the field to record shots fired at different depths, it is necessary to provide means which will enable corrections to be introduced to correct for changes in reflection timing due to differences in the shot depths. This may conveniently be done by varying the position of the firing switch M3 in the recorder, by means, for example, of a sliding vernier or a micrometer adjustment.

Such corrections will not normally be necessary when the thumping technique is employed, but the spread of the group of thumps must be limited so that the dynamic spread correction which is theoretically correct for each pen does not deviate too much from that actually applied. Since the location of the geophone groups is not changed during a group of thumps, the static correction will only have to be set once for each group.

As has been stated it is possible to use or to adapt the variable density recorder which has been described for effecting sequential play-back from magnetic tape, with or without the compositing of a number of signals for each trace which is recorded. This method is necessary when re-recording from a magnetic recorder which only provides for sequential play-back and not simultaneous play-back from a number of traces. If the paper or other recording base which is used for the variable density recording will stand up to the necessary number of repeated sweeps by the recording pens (which are twelve in the apparatus shown), no modification of the latter is necessary. Recording is effected merely by using each pen in turn and by indexing only after the full number of sweeps have been made.

If, however, the recording base used will not stand up to the full number of sweeps of all the pens at full pen pressure, then further modification of the apparatus may be required. This may include the provision of electromagnetic or other means for causing each pen in turn to engage the record sheet, one pen at a time.

Alternatively, only a single pen may be used, in conjunction with means for indexing it relatively to the cam shaft after each sweep in order to provide the necessary spread corrections for the different traces.

The variable density recorder, as described, includes twelve pen amplifiers which supply the recording styli or pens and which will accept the outputs from the usual seismic amplifiers, such as are currently used in conjunction with the geophones during seismic surveying. When the pen amplifiers used are of the thermionic valve type, the recording styli may be connected in the cathode circuit of the output valves of the amplifiers as has been described, so that the standing currents to the valves provide medium tone bias currents through the paper, on which bias currents the signal currents are superimposed.

It may, however, be desired to utilise transistors, in place of thermionic valves, for the pen amplifiers. This offers particular advantages when the recording is to be effected in the field, owing to the reductions it makes possible in the size and weight of the apparatus and, which is more important, the reduction in the power supply required, which can readily be obtained from batteries.

Since transistors are inherently low-impedance devices, a 12-volt supply, such as is convenient in practice, is not sufficient to produce the required variations in current through the usual recording papers, the resistance of which is of the order of 3,000 ohms. The present invention, in one of its aspects, provides a method of overcoming this difficulty.

According to this feature of the invention, a variable density recorder for producing variable density seismic records, particularly variable density records which are produced by electro-chemical deposition on a paper or other base, is provided with means for generating a high frequency signal which is modulated by the seismic signal to be recorded, before being supplied to the recording elements or styli. Generally, the recording current must be uni-directional so that the modulated signal must be rectified before being supplied to the recording elements, it being preferred to use full wave rectification for this purpose.

Where the recording apparatus is designed to produce a number of simultaneous records by means of a plurality of recording styli or pens, or by using a common wide stylus and a laminated backing plate, as has been described, the high frequency signal, whose frequency (e.g. 3000 c.p.s.) should be at least two or three times the highest seismic signal frequency to be recorded, may be generated by a single oscillator (preferably one of the transistorized type) the output of which is supplied to the individual pen amplifiers in which the modulation and rectification is effected.

The depth of modulation is adjusted to be 100% for the highest seismic signal likely to be encountered; the output of the last transistor amplifier will then be a modulated high frequency signal varying between zero and a value double that corresponding to the absence of seismic signal. The resulting signal is voltage-amplified by means of a transformer (which can be of small size and weight owing to the high frequencies involved) between the last transistor, which has a low impedence and which is working at a low voltage, to the recording circuit through the paper, which has a higher impedance but for which the stepped-up voltage is available, owing to the use of the transformer. A full-wave rectifier is interposed between the transformer secondary and the pen itself.

The variable density recorders described is intended for use where the geophone spread (i.e. the distances between the geophones) is always the same. For example, in marine surveying the spread is determined by the distances between the geophones along the cable to which they are attached. The distances between the traces on the record will, therefore, be proportional to the distances between the geophones.

It is preferred that, in land work also, the spacing of the traces in the cross-sectional record should always be proportional to the distances on the ground between the geophones. With the recording apparatus which has been described, this means that the geophone intervals must be kept constant. It sometimes happens, however, that, for reasons of accessibility, some of the shot points may have to be closer together than the normal. In this case the number of geophones between shot points will have to be reduced if their spacing is to the remain the same. When using the variable density recorder which has been described, this means that the unused pen amplifiers must be switched off and the amount by which the paper is indexed between the shots reduced proportionately.

The change in the indexing could be effected by any suitable means, such as by modifying the drive to the spider 25 or by replacing the latter by one having a different number of arms.

Alternatively indexing through a variable distance, which can be pre-set to suit the number of geophones used, could be arranged to take place automatically, utilising a suitable arrangement of relays controlled by a timing or other signal which would stop the indexing after the required movement had been effected.

Another way would be for the indexing to be controlled manually by the operator, who would watch the recording.

If, instead of merely varying the number of geophones, the geophone intervals are changed between one spread and the next, it becomes necesasry to make changes in the spread correcting mechanism, in order to compensate for this; alternatively, interchangeable cams may be used.

The latter arrangement will probably be found to be the more convenient, but if it is desired to provide for variable adjustments in the apparatus of the continuously variable type, this may be done by including an infinitely variable, variable speed gear between the crank 65, which is operated from the velocity function groove 67 in the plate 68, and the cam shaft 57 which carries the spread-correcting cams. This gear may be of the so called "potter's wheel" or friction disc type.

If field conditions allow the spread to be always one of two or three standard lengths, suitable gear ratios in the gears 75 and 76 may be provided to adjust for these changes.

Even the use of an infinitely variable gear does not make it possible to deal with records from spreads in which there are non-uniform and non-standard distances between the geophones, the usual standard being to have equal distances between all the geophones with the shot point mid-way between the two central geophones. This problem can be best dealt with by using interchangeable cams, a sufficient number of these being provided to cover, with sufficient accuracy, all likely distributions of the geophones.

It will be apparent that the method and apparatus of the invention possess many important features and advantages. Thus, they make it possible to provide, by direct recording and without the delays due to processing or transposing, such as are involved in magnetic and/or photographic recording, an accurate and corrected visual representation of a cross-section of the earth's crust. This can be observed while surveying is actually in progress, particularly in marine surveying. This is a most valuable feature since it enables any necessary modifications in the surveying procedure to be made at the time.

The production of the properly corrected, closely-adjacent, variable density traces greatly assists in the interpretation of the records and in the quick identification of important geological features, especially while the survey is in progress.

Finally, it may be remarked that when producing a cross-section record, as has been described, it is not only necessary that static and dynamic corrections should be introduced, but also the traces must be aligned on the final record in corresponding time positions, which is referred to above as "zeroing" the traces. In producing a cross-section in the field in direct response to detected signals, the use of the switch M3 to fire the shot or initiate the seismic disturbance effectively zeroes all of the traces on the final cross-section, since it establishes a time reference which is common to all of the traces.

If the apparatus is being used in conjunction with reproducible records some other means of zeroing must be employed. It may, for example, be effected by using the time break signals to start the recording.

We claim:

1. Apparatus for use in seismic prospecting to produce a visible cross-section record upon a single recording medium in direct response to signals arriving at a plurality of detectors from a series of seismic wave disturbances, said apparatus comprising means for supporting said recording medium; a plurality of recording devices acting upon said recording medium to produce a corresponding number of visual indications, there being at least one such device for each of the detectors; means for simultaneously supplying the outputs of the detectors directly to respective ones of the recording devices; means for producing relative movement between said recording medium and said devices as said outputs are supplied so that said visual indications appear as a set of side by side traces, with each trace being representative of signals arriving at one of the detectors, whereby said recording devices simultaneously record a set of traces representing the signals arriving at the detectors from one of the seismic wave disturbances; means automatically effective at the completion of the recording of the set of traces for producing relative movement between said recording medium and said recording devices in a direction extending transversely of the traces, means for automatically establishing a common time base having a common zero point for the sets of traces developed from successive seismic wave disturbances, whereby these sets of traces are recorded side by side upon said single medium; and means for introducing time corrections in the traces appearing on the cross-section record so that the signals on all of the traces of all of the sets appear in corresponding time positions, whereby signals reflected to the detectors from a subsurface interface are aligned on the cross-section record in accordance with the contour of the interface.

2. Apparatus for use in seismic prospecting to produce a visible cross-section record upon a single recording medium in direct response to signals arriving at a plurality of detectors from a series of seismic wave disturbances, said apparatus comprising means for supporting said recording medium; a plurality of recording devices acting upon said recording medium to produce a corresponding number of visual indications, there being at least one such device for each of the detectors; means for simultaneously supplying the outputs of the detectors directly to respective ones of the recording devices; means for producing relative movement between said recording medium and said devices as said outputs are supplied so that said visual indications appear as a set of side by side traces, with each trace being representative of signals arriving at one of the detectors, whereby said recording devices simultaneously record a set of traces representing the signals arriving at the detectors from one of the seismic wave disturbances; means automatically effective at the completion of the recording of the set of traces for producing relative movement between said recording medium and said recording devices in a direction extending transversely of the traces, means for automatically establishing a common time base having a common zero point for the sets of traces developed from successive seismic wave disturbances, whereby these sets of traces are recorded side by side upon said single medium; and means for relatively moving said recording devices and said recording medium in the direction of the traces in order to introduce time corrections so that signals on all of the traces of all of the sets appear on the cross-section record in corresponding time positions, whereby signals reflected to the detectors from an interface in the subsurface formations are aligned on the cross-section record in accordance with the contour of the interface.

3. Apparatus for use in seismic prospecting to produce a visible cross-section record upon a single recording medium in direct response to signals arriving at a plurality of detectors from a series of seismic wave disturbances, said apparatus comprising means for supporting said recording medium; a plurality of recording devices acting upon said recording medium to produce a corresponding number of visual indications, there being at least one such device for each of the detectors; means for simultaneously supplying the outputs of the detectors directly to respective ones of the recording devices; means for producing relative movement between said recording medium and said devices as said outputs are supplied so that said visual indications appear as a set of side by side traces, with each trace being representative of signals arriving at one of the detectors, whereby said recording devices simultaneously record a set of traces representing the signals arriving at the detectors from one of the seismic wave disturbances; means automatically effective at the completion of the recording of the set of traces for producing relative movement between said recording medium and said recording devices in a direction extending transversely of the traces, means for automatically establishing a common time base having a common zero point for the sets of traces developed from successive seismic wave disturbances, whereby these sets of traces are recorded side by side upon said single medium; means for adjusting the positions of said recording devices individually and in the direction of the traces prior to the recording of the traces in order to introduce static corrections; and means acting upon said recording devices and operated by movement of said devices during the recording of said traces for moving said devices in the direction of the traces in order to introduce dynamic corrections so that aligned signals on the traces of all of the sets represent the contour of the subsurface interfaces reflecting the seismic waves to the detectors.

4. Apparatus for use in seismic prospecting to produce upon a single recording medium a cross-section record representing signals arriving at a plurality of detectors from a series of seismic wave disturbances, said apparatus comprising means for supporting said recording medium for movement in step by step fashion past a plurality of recording devices, there being at least one such device for each of the detectors, the last named means being effective to hold the recording medium stationary for a predetermined interval between each of the step by step movements, means for moving said recording devices in unison transversely of the direction of step by step movement of said recording medium during each of the predetermined intervals in order to develop a plurality of sets of side by side traces in corresponding time positions, with one such set of traces being developed during each of the predetermined intervals and being representative of signals arriving at the detectors from one of said seismic disturbances and means for automatically establishing a common time base having a common zero point for all sets of traces so that the sets of traces are automatically recorded in corresponding time positions upon the recording medium.

5. Apparatus for use in seismic prospecting to produce a visible cross-section record upon an elongated recording medium in direct response to seismic wave signals arriving at a plurality of detectors from a series of seismic wave disturbances after reflection from one or more subsurface interfaces, said apparatus comprising means for supporting said recording medium for movement in step by step fashion past a plurality of recording devices, there being at least one such device for each of the detectors, the last named means being effective to hold the recording medium stationary for a predetermined interval between each of the step by step movements, means for moving said recording devices in unison transversely of the direction of movement of said elongated medium during each of the predetermined intervals in order to develop a plurality of sets of side by side traces, with one such set of traces being developed during each of the predetermined intervals and being representative of signals arriving at the detectors from one of said seismic disturbances, means for automatically establishing a common time base having a common zero point for all sets of traces so that the sets of traces are automatically recorded in corresponding time positions upon the recording medium, and means for introducing time corrections into the recorded traces so that all of the traces of all of the sets appear in corresponding time positions with the signals reflected from one interface being aligned in accordance with the contour of said one interface.

6. Apparatus for use in seismic prospecting to produce a cross-section record upon an elongated recording medium in direct response to seismic wave signals arriving at a plurality of detectors from a series of seismic wave disturbances after reflection from one or more subsurface interfaces, said apparatus comprising means for supporting said recording medium for movement in step by step fashion past a plurality of recording devices, there being at least one such device for each of the detectors, the last named means being effective to hold the recording medium stationary for a predetermined interval between each of the step by step movements, means for moving said recording devices in unison transversely of the direction of movement of said elongated medium during each of the predetermined intervals in order to develop a plurality of sets of side by side traces, with one such set of traces being developed during each of the predetermined intervals and being representative of signals arriving at the detectors from one of said seismic disturbances, means for automatically establishing a common time base having a common zero point for all sets of traces so that the sets of traces are automatically recorded in corresponding time positions upon the recording medium, and means for adjusting the positions of said recording devices in the direction of the traces in order to introduce static and dynamic corrections so that signals arriving at the detectors after reflection from one of the interfaces are aligned on the traces of all of the sets in accordance with the contour of said one interface.

7. Apparatus for use in seismic prospecting to produce a visible cross-section record upon an elongated recording medium in direct response to seismic wave signals arriving at a plurality of detectors from a series of seismic wave disturbances after reflection from one or more subsurface interfaces, said apparatus comprising means for supporting said recording medium for movement in step by step fashion past a plurality of recording devices, there being at least one such device for each of the detectors, the last named means being effective to hold the recording medium stationary for a predetermined interval between each of the step by step movements, means for moving said recording devices in unison transversely of the direction of movement of said elongated medium during each of the predetermined intervals in order to develop a plurality of sets of side by side traces, with one such set of traces being developed during each of the predetermined intervals and being representative of signals arriving at the detectors from one of said seismic disturbances, means for automatically establishing a common time base having a common zero point for all sets of traces so that the sets of traces are automatically recorded in corresponding time positions upon the recording medium, means for adjusting the positions of said recording devices individually and in the direction of the traces prior to the recording of each set of traces in order to introduce static corrections, and means acting upon said recording devices and operated during the recording of said traces for moving said recording devices in the direction of the traces in order to introduce dynamic corrections so that aligned signals on the traces of all of the sets represent the contour of the subsurface interfaces reflecting the seismic wave signals to the detectors.

8. Apparatus for developing upon a recording medium sensitive to electrical currents a visible cross-section representing signals received by a plurality of detectors from a series of seismic wave disturbances, said apparatus comprising a plurality of spaced apart recording elements and record engaging structure cooperating to define a recording area, means for supporting said recording medium and moving it in step by step fashion through said recording area between the structure and the recording elements, a movable carriage supporting said recording elements and movable over said recording medium in a direction generally transverse to the direction of movement of the medium through the recording area, means for passing current derived from the detectors between said structure and said recording elements through said recording element so that said recording elements develop a set of side by side variable density traces upon said recording medium with each set of traces representing signals arriving at the detectors from one of the seismic wave disturbances, a carriage drive for moving said carriage from an initial position in a first direction in order to record said set of traces and for returning said carriage to said initial position following the recording of said set of traces, and means including an electrical circuit for automatically initiating each seismic wave disturbance and controlling the movement of the carriage and the recording medium, the last named means including a first switch engaged by the carriage at the completion of the recording of each set of traces, a second switch engaged by the carriage as it is returned to said initial position, and a third switch engaged by the carriage a short time after it is moved from the initial position, said circuit being effective when said second switch is engaged to render the carriage drive means operative to move the carriage from the initial position at the start of the recording operation, said circuit also being effective when the first switch is engaged to render the carriage drive means operative to return the carriage to its initial position and to actuate the supporting means for the recording medium in order to move a clean section of the medium into the recording area, said circuit being effective when said third switch is engaged to initiate one of the seismic wave disturbances, whereby successive movements of said carriage through the recording area result in the initiation of successive ones of the disturbances and the production of sets of side by side traces upon said recording medium with each set of traces representing the signals arriving at said detectors from one of said seismic disturbances and with all of the sets of traces having a common time base with common zero points.

9. Apparatus for developing upon a recording medium a visible cross-section representing signals arriving at a plurality of detectors from a series of seismic wave disturbances, said apparatus comprising means including a plurality of spaced apart recording elements for defining a recording area, means for supporting said recording medium and moving it in step by step fashion through said recording area, a movable carriage supporting said recording elements and movable over said recording medium in a direction generally transverse to the direction of movement of the medium through the recording area, means responsive to signals arriving at the detectors for causing said recording elements to develop a set of traces upon said recording medium with each trace representing the signals arriving at one of the detectors from one of the seismic wave disturbances, a carriage drive for moving said carriage from an initial position in a first direction so that said visual indications appear as a set of side by side traces and for returning said carriage to said initial position following the recording of said set of traces, and means including an electrical circuit for automatically initiating the seismic wave disturbances and for controlling the movement of the carriage and the recording medium, the last named means including a first switch engaged by the carriage at the completion of the recording of each set of traces, a second switch engaged by the carriage as it is returned to said initial position, and a third switch engaged by the carriage a short time after it is moved from the initial position, said circuit being effective when said second switch is engaged to render the carriage drive means operative to move the carriage from the initial position at the start of the recording operation, said circuit also being effective when the first switch is engaged to render the carriage drive means operative to return the carriage to its initial position and to actuate the supporting means for the recording medium in order to move a clean section of the medium into the recording area, said circuit being effective when said third switch is engaged to initiate one of the seismic wave disturbances, whereby successive movements of said carriage through the recording area result in the initiation of successive ones of the disturbances and the production of sets of traces side by side upon said recording medium with each set of traces representing the signals arriving at said detectors from one of said seismic disturbances and with all of the sets of traces having a common time base with common zero points.

10. Apparatus for developing upon a recording medium a visible cross-section representing signals received by a plurality of detectors from a series of seismic wave disturbances, said apparatus comprising recording means, drive means for relatively moving said recording medium and said recording means in step by step fashion, mechanism for moving said recording means over said recording medium from an initial position in a first direction in order to develop a set of side by side traces upon said recording medium and for returning said recording means to said initial position following the recording of said traces, and means including an electrical circuit for automatically initiating the seismic wave disturbances and for controlling the drive means and the mechanism, the last named means including a first switch operated when the recording means is in said initial position, a second switch operated at the completion of the recording of each set of traces, and a third switch engaged by the carriage a short time after it is moved from the initial position, said circuit being effective when said first switch is operated to render the mechanism operative to move the recording means from the initial position at the start of the recording operation, said circuit also being effective when the second switch is engaged to return the carriage to its initial position and to actuate the drive means to present a clean section of the recording medium to the recording means, said circuit being effective when said third switch is engaged to initiate one of the seismic wave disturbances, whereby successive movements of said carriage through the recording area result in the initiation of successive ones of the disturbances and the production of sets of time corrected traces side by side upon said recording medium with each set of traces representing the signals arriving at said detectors from one of said seismic disturbances and with all of the sets of traces having a common time base with common zero points.

11. Apparatus for developing upon a recording medium sensitive to electrical currents a visible cross-section in response to signals received by a plurality of detectors from a series of seismic wave disturbances, said apparatus comprising a plurality of spaced apart recording elements and a record engaging structure cooperating to define a recording area, means for supporting said recording medium and moving it in step by step fashion through said recording area between the structure and the recording elements, a movable carriage supporting said recording elements and movable over said recording medium in a direction generally transverse to the direction of movement of the medium through the recording area, means for passing current between said structure and said recording elements through said recording medium so that said recording elements develop a set of side by side variable density traces upon said recording medium, a carriage drive for moving said carriage from an initial position in a first direction in order to record said set of traces and for returning said carriage to said initial position following the recording of said set of traces, manually operated means for adjusting the position of each of said recording elements upon the carriage in a direction extending generally parallel to the direction of movement of the carriage in order to introduce static corrections in each of the recorded traces, cam means acting upon each of the recording elements to move said elements on said carriage in a direction generally parallel to the carriage movement as said carriage is moved through the recording area in said first direction in order to introduce dynamic corrections, a common shaft carrying all of said cam means, mechanism for turning said common shaft in response to the carriage movement, said mechanism including a cam guide mounted generally parallel to the direction of movement of the carriage and a follower carried by said carriage and engaging said guide, means mounting said recording elements for movement into and out of engagement with said recording medium, and means including an electrical circuit for automatically controlling the movement of the carriage, the recording elements, the recording medium and the generation of the seismic disturbances, the last named means including a first switch engaged by the carriage at the completion of the recording of each set of traces, a second switch engaged by the carriage as it is returned to said initial position, and a third switch engaged by said carriage soon after it is moved from the initial position during the recording of the traces, said circuit being effective when said second switch is engaged to render the carriage drive operative to move the carriage from the initial position at the start of the recording operation, and to move the recording elements into engagement with the recording medium, said circuit also being effective when the third switch is engaged to initiate one of the seismic disturbances and being effective when the first switch is engaged to render the carriage drive means operative to return the carriage to its initial position, to move the recording elements out of engagement with the recording medium, and to actuate the supporting means for the recording medium in order to move a clean section of the medium into the recording area, whereby successive movements of said carriage through the recording area result in the production of sets of time corrected traces side by side upon said recording medium with each set of traces representing the signals arriving at said detectors from one of said seismic disturbances.

12. Apparatus for developing upon a recording medium sensitive to electrical currents a visible cross-section representing signals received by a plurality of detectors from a series of seismic wave disturbances, said apparatus comprising a plurality of spaced apart recording elements and a record engaging plate cooperating to define a recording area, means for supporting said recording medium and moving it in step by step fashion through said recording area between the plate and the recording elements, a movable carriage supporting said recording elements and movable over said recording medium in a direction generally transverse to the direction of movement of the medium through the recording area, means for passing current between said plate and said recording elements through said recording element so that said recording elements develop a set of side by side traces upon said recording medium, a carriage drive for moving said carriage from an initial position in a first direction in order to record one set of said traces and for returning said carriage to said initial position following the recording of said one set of traces, means mounting said recording elements for movement into and out of engagement with said recording medium, and means including an electrical circuit for automatically controlling the movement of the carriage, the recording elements, and the recording medium, the last named means including a first switch engaged by the carriage at the completion of the recording of each set of traces, and a second switch engaged by the carriage as it is returned to said initial position, said circuit being effective when said second switch is engaged to render the carriage drive means operative to move the carriage from the initial position at the start of the recording operation and to move the recording elements into engagement with the recording medium, said circuit also being effective when the first switch is engaged to render the carriage drive means operative to return the carriage to its initial position, to move the recording elements out of engagement with the recording medium, and to actuate the supporting means for the recording medium in order to move a clean section of the medium into the recording area, whereby successive movements of said carriage through the recording area result in the production of sets of traces side by side upon said recording medium with each set of traces representing the signals arriving at said detectors from one of said seismic disturbances.

13. Apparatus for developing upon a recording medium sensitive to electrical currents a visible cross-section in response to signals received by a plurality of detectors from a series of seismic wave disturbances, said apparatus comprising a plurality of spaced apart recording elements and a record engaging structure cooperating to define a recording area, means for supporting said recording medium and moving it in step by step fashion through said recording area between the structure and the recording elements, a movable carriage supporting said recording elements and movable over said recording medium in a direction generally transverse to the direction of movement of the medium through the recording area, means for passing current derived from the detectors between said structure and said recording elements through said recording medium so that said recording elements develop a set of side by side traces upon said recording medium in response to signals arriving at the detectors from one of the seismic wave disturbances, a carriage drive for moving said carriage from an initial position in a first direction in order to record one set of said traces and for returning said carriage to said initial position following the recording of said traces, means for adjusting the position of each of said recording elements upon the carriage in a direction extending generally parallel to the direction of movement of the carriage in order to introduce static corrections in each of the recorded traces, means acting upon each of the recording elements to move said elements on said carriage in a direction generally parallel to the carriage movement as said carriage is moved through the recording area in said first direction in order to introduce dynamic corrections, means mounting said recording elements for movement into and out of engagement with said recording medium, and means including an electrical circuit for automatically controlling the movement of the carriage, the recording elements, the recording medium and the generation of the seismic disturbances, the last named means including a first switch engaged by the carriage at the completion of the recording of each set of traces, a second switch engaged by the carriage as it is returned to said initial position, and a third switch engaged by said carriage soon after it is moved from the initial position during the recording of the traces, said circuit being effective when said second switch is engaged to render the carriage drive means operative to move the carriage from the initial position at the start of the recording operation and to move the recording elements into engagement with the recording medium, said circuit also being effective when the third switch is engaged to initiate one of the seismic disturbances and being effective when the first switch is engaged to render the carriage drive means operative to return the carriage to its initial position, to move the recording elements out of engagement with the recording medium, and to actuate the supporting means for the recording medium in order to move a clean section of the medium into the recording area, whereby successive movements of said carriage through the recording area result in the production of sets of time corrected traces side by side upon said recording medium with each set of traces representing the signals arriving at said detectors from one of said seismic disturbances and with the sets of traces having common time bases and common zero points so that corresponding events are properly aligned along the recording medium.

14. Apparatus for developing upon a recording medium sensitive to electrical currents a plurality of traces representing signals received by a plurality of detectors from at least one seismic wave disturbance, said apparatus comprising a plurality of spaced apart recording elements and a record engaging structure cooperating to define a recording area, means for supporting said recording medium and moving it through said recording area between the structure and the recording elements, a movable carriage supporting said recording elements and movable over said recording medium in a direction generally transverse to the direction of movement of the medium through the recording area, means responsive to signals from the detectors for passing current between said structure and said recording elements through said recording medium as said elements are moved through the recording area, thereby to develop a set of side by side variable density traces, a carriage drive for moving said carriage from an initial position in a first direction in order to record said set of traces and for returning said carriage to said initial position following the recording of said set of traces, manually operated means for adjusting the position of each of said recording elements upon the carriage in a direction extending generally parallel to the direction of movement of the carriage prior to the recording of the traces in order to introduce static corrections, a cam acting upon each of the recording elements to introduce dynamic corrections by moving said elements on said carriage in a direction generally parallel to the carriage movement as said carriage is moved through the recording area in said first direction, a common support for all of said cams, a cam guide extending generally parallel to the direction of movement of the carriage and substantially coextensive with the carriage movement, and follower structure connected to said support and engaging said guide, said guide being constructed and arranged to act through said follower structure to turn said cams in order to introduce the dynamic corrections as said carriage is moved during the recording of the traces.

15. Apparatus for developing upon a recording medium sensitive to electrical currents a plurality of traces representing signals received by a plurality of detectors from at least one seismic wave disturbance, said apparatus comprising a plurality of spaced apart recording elements, a movable carriage supporting said recording elements and movable over said recording medium, means responsive to signals from the detectors for causing said recording elements to develop a set of side by side traces upon said recording medium, a carriage drive for moving said carriage from an initial position in a first direction in order to record said set of traces and for returning said carriage to said initial position following the recording of said set of traces, means for adjusting the position of each of said recording elements upon the carriage in a direction extending generally parallel to the direction of movement of the carriage prior to the recording of the traces in order to introduce static corrections, a cam acting upon each of the recording elements to introduce dynamic corrections by moving said elements on said carriage in a direction generally parallel to the carriage movement as said carriage is moved during the recording of the traces, a common support for all of said cams, a cam guide extending generally parallel to the direction of movement of the carriage and substantially coextensive with the carriage movement, and follower structure connected to said support and engaging said guide, said guide being constructed and arranged to act through said follower structure to turn said cams in order to introduce the dynamic corrections as said carriage is moved during the recording operation.

16. Apparatus for developing upon a recording medium sensitive to electrical currents a plurality of traces representing signals received by a plurality of detectors from at least one seismic wave disturbance, said apparatus comprising a plurality of spaced apart recording elements, a movable carriage supporting said recording elements and movable over said recording medium, means responsive to signals from the detectors for causing said recording elements to develop a set of side by side traces upon said recording medium, a carriage drive for moving said carriage from an initial position in a first direction in order to record said set of traces and for returning said carriage to said initial position following the recording of said set of traces, cam means acting upon the recording elements to introduce dynamic corrections by moving said elements on said carriage in a direction generally parallel to the carriage movement as said carriage is moved in said first direction, and means for turning said cam means in response to the carriage movement, the cam turning means including a cam guide extending generally parallel to the direction of movement of the carriage and substantially coextensive with the carriage movement and follower structure engaging said guide and arranged to turn said cam means as said carriage is moved.

17. The structure defined by claim 16 wherein manually operated means are provided for individually adjusting the recording elements upon the carriage in the direction of carriage movement in order to introduce static corrections prior to the recording of the traces.

18. Apparatus for use in seismic prospecting to produce upon a recording medium traces representing signals arriving at a plurality of detectors from a series of seismic wave disturbances, said apparatus comprising means for supporting said recording medium for movement in step by step fashion past a recording means, the record supporting means being effective to hold the recording medium stationary for a predetermined interval between each of the step by step movements, means including a synchronous drive motor for moving said recording means at constant speed over said recording medium during each of the predetermined intervals, means normally connecting the recording means to the detectors during the movement of the recording means in order to develop upon said medium traces representing the signals arriving at the detectors, timing signal generating means for producing a timing signal for driving said synchronous motor at constant speed, and means actuated after a predetermined number of step by step movements of the recording medium for interrupting the connection between the recording means and the detectors during one of said intervals and for instead connecting the timing signal generating means to the recording means, thereby to record the timing signal upon the recording medium during said one interval.

19. Apparatus for use in seismic prospecting to produce upon a single recording medium a cross section record representing signals arriving at a plurality of detectors from a series of seismic wave disturbances, said apparatus comprising means for supporting said recording medium for movement in step by step fashion past a plurality of recording devices, there being one such device for each detector, the record supporting means being effective to hold the recording medium stationary for a predetermined interval between each of the step by step movements, means including a synchronous drive motor for moving said recording means at constant speed over said recording medium during each of the predetermined intervals, means normally connecting the recording means to the detectors during the movement of the recording means in order to develop upon said medium traces representing the signals arriving at the detectors, timing signal generating means for producing a timing signal for driving said synchronous motor at constant speed, and means actuated after a predetermined number of step by step movements of the recording medium for interrupting the connection between the recording means and the detectors during one of said intervals and for instead connecting the timing signal generating means to the recording means, thereby to record a timing signal upon the recording medium during said one interval.

20. Apparatus for use in seismic prospecting to produce upon a recording medium traces representing signals arriving at a plurality of detectors from a series of seismic wave disturbances, said apparatus comprising means for supporting said recording medium for movement in step by step fashion past a recording means, the record supporting means being effective to hold the recording medium stationary for a predetermined interval between each of the step by step movements, means for moving said recording means over said recording medium during each of the predetermined intervals, means normally connecting the recording means to the detectors during the movement of the recording means to produce upon the recording medium side by side traces representing the signals arriving at the detectors, timing signal generating means for producing a timing signal, and means actuated after a predetermined number of step by step movements of the recording medium for interrupting the connection between the recording means and the detectors during one of said intervals and for instead connecting the timing signal generating means to the recording means, thereby to record the timing signal upon the recording medium during said one interval.

21. Apparatus for use in seismic prospecting to produce upon a single recording medium a cross section record representing signals arriving at a plurality of detectors from a series of seismic wave disturbances, said apparatus comprising means for supporting said recording medium for movement in step by step fashion past a plurality of recording devices, there being one such device for each detector, the record supporting means being effective to hold the recording medium stationary for a predetermined interval between each of the step by step movements, means for moving said recording devices over said recording medium during each of the predetermined intervals, means normally connecting the recording devices to the detectors during the movement of the recording means in order to develop upon said medium traces representing the signals arriving at the detectors, timing signal generating means for producing a timing signal, and means actuated after a predetermined number of step by step movements of the recording medium for effectively interrupting the connection between all of the recording devices and the detectors during one of said predetermined intervals and for instead connecting the timing signal generating means to at least one of the recording devices, thereby to record the timing signal upon the recording medium during said one interval.

22. Apparatus for use in seismic prospecting to produce a variable density cross section record upon an elongated recording medium in direct response to seismic wave signals arriving at a plurality of detectors from a series of seismic wave disturbances after reflection from one or more subsurface interfaces, said apparatus comprising means for supporting said recording medium for movement in step by step fashion past a plurality of recording devices, there being at least one such device for each of the detectors, the last named means being effective to hold the recording medium stationary for a predetermined interval between each of the step by step movements, means for moving said recording devices in unison transversely of said elongated medium during each of the predetermined intervals in order to develop during each interval a set of side by side variable density traces representing signals arriving at the detectors from one of the seismic wave disturbances, means for relatively moving the recording devices to introduce static and dynamic time corrections so that all of the traces of all of the sets appear in corresponding time positions, means for selectively rendering the supporting and moving means ineffective to advance the recording medium so that the recording devices move over a common area of the medium during successive ones of the predetermined intervals, whereby the traces on said common area represent a composite of the signals arriving at the detectors from different seismic wave disturbances during said successive intervals, and means for reducing the intensity of the traces recorded on said recording medium during each of the successive intervals, thereby to control the final intensity of the composite traces.

23. Apparatus for use in seismic prospecting to produce a variable density cross section record upon an elongated recording medium in direct response to seismic wave signals arriving at a plurality of detectors from a series of seismic wave disturbances after reflection from one or more subsurface interfaces, said apparatus comprising means for supporting said recording medium for movement in step by step fashion past a plurality of recording devices, there being at least one such device for each of the detectors, the last named means being effective to hold the recording medium stationary for a predetermined interval between each of the step by step movements, means for moving said recording devices in unison transversely of said elongated medium during each of the predetermined intervals in order to develop during each interval a set of side by side variable density traces representing signals arriving at the detectors from one of the seismic wave disturbances, means for selectively rendering the supporting and moving means ineffective to advance the recording medium so that the recording devices move over a common area of the medium during successive ones of the predetermined intervals, whereby the traces on said common area represent a composite of the signals arriving at the detectors from different seismic wave disturbances during said successive intervals, and means for reducing the intensity of the traces recorded during each of the successive intervals in order to control the final intensity of the composite traces.

24. Apparatus for developing upon a recording medium sensitive to electrical currents a visible cross section representing signals received by a plurality of detectors from a series of seismic wave disturbances, said apparatus comprising a plurality of spaced apart recording elements and a record engaging structure cooperating to define a recording area, means for supporting said recording medium and moving it in step by step fashion with the recording medium being held within said recording area between the structure and the recording elements during predetermined intervals between each step by step movement, a movable carriage supporting said recording elements and movable over said recording medium in a direction generally transverse to the direction of movement of the medium through the recording area, means responsive to signals from the detectors for passing current between said structure and said recording elements through said recording element so that said recording elements develop a set of side by side variable density traces upon said recording medium during each of the predetermined intervals, a carriage drive for moving said carriage from an initial position in a first direction in order to record said set of traces and for returning said carriage to said initial position following the recording, manually operated means for adjusting the position of each of said recording elements upon the carriage in a direction extending generally parallel to the direction of movement of the carriage prior to the recording operation in order to introduce static corrections in each of the recorded traces, means acting upon each of the recording elements to move said elements on said carriage in a direction generally parallel to the carriage movement as said carriage is moved through the recording area in said first direction in order to introduce dynamic corrections, means for selectively rendering the supporting and moving means ineffective to advance the recording medium so that the recording elements move over a common area of the medium during successive ones of the predetermined intervals, whereby the traces on said common area represent a composite of the signals arriving at the detectors from different seismic wave disturbances during said successive intervals, and means for reducing the current flow through said recording medium during each of the successive intervals to control the intensity of the composite traces.

25. A device for developing upon a recording medium a visible cross section representing signals arriving at a plurality of detectors from a series of seismic wave disturbances, said apparatus comprising means including a plurality of spaced apart recording elements for defining a recording area, means for supporting said recording medium and moving it in step by step fashion through said recording area, a movable carriage supporting said recording elements and movable over said recording medium in a direction generally transverse to the direction of movement of the medium through the recording area, means responsive to signals from the detector for causing said recording elements to develop a set of traces upon said recording medium representing the signals arriving at the detectors from one of the seismic wave disturbances, a carriage drive including a reversible motor and a clutch transmitting the drive from the motor to the carriage for moving said carriage from an initial position in a first direction to record said traces and for returning said carriage to said initial position following the recording, and an electrical control circuit for automatically controlling the initiation of the seismic wave disturbances and the movements of the carriage and the recording medium, said circuit including a first switch engaged by the carriage at the completion of the recording of each set of traces, a second switch engaged by the carriage as it is returned to said initial position, and a third switch engaged by said carriage a short period after it moves in said first direction from said initial position, said circuit having a first subcircuit including said second switch and effective when said second switch is disengaged with said carriage in said initial position to energize said clutch in order to connect the drive motor to the carriage, a second subcircuit for supplying drive signals to the motor and including sets of contacts of first and second motor control relays and contacts of a motor reversing relay, said second circuit being effective with the carriage in its initial position to drive the motor in a forward direction so that with the clutch engaged the carriage is moved in said first direction, a third subcircuit including the third switch and completed when said third switch is engaged by the carriage during movement in said first direction for initiating the seismic wave disturbance, said second switch when engaged by the carriage at the completion of the recording operation being effective to break said first subcircuit to deenergize the clutch and to energize a main control relay, a fourth subcircuit including contacts of the main control relay and effective when the latter is energized to supply current to a motor control circuit, said motor control circuit including a capacitor connected in series with the winding of the first motor relay so that the completion of the fourth subcircuit charges the capacitor through the winding of the first relay, thereby energizing the first relay to break said second subcircuit in order to stop the motor at the completion of the recording operation, a fifth subcircuit including contacts of the first relay for supplying power to the record supporting and moving means in order to advance the recording medium at the completion of the recording operation, means including contacts of the main control relay for completing a clutch energizing circuit to the clutch as soon as the main control relay is energized, said first relay being automatically deenergized to recomplete said second subcircuit as soon as said capacitor charges, said motor control circuit further including the winding of the motor reverse relay which is connected to be energized from said fourth subcircuit as soon as the capacitor charges and which, when energized, causes its contacts to reverse the drive through the second circuit to the motor, thereby returning the carriage to its initial position, said first switch when engaged by return of the carriage completing a circuit to discharge the capacitor through the winding of the second motor control relay whereupon the second relay is energized to break the second subcircuit, thereby stopping the motor, and means connecting said first switch to the main control relay to break the latter when the first switch is engaged, thereby to break the clutch energizing circuit to release the clutch and to reset the electrical control circuit for the next cycle of operation.

26. A device for developing upon a recording medium a visible cross section representing signals arriving at a plurality of detectors from a series of seismic wave disturbances, said apparatus comprising means including a plurality of spaced apart recording elements for defining a recording area, means for supporting said recording medium and moving it in step by step fashion through said recording area, a movable carriage supporting said recording elements and movable over said recording medium in a direction generally transverse to the direction of movement of the medium through the recording area, means responsive to signals from the detector for causing said recording elements to develop a set of traces upon said recording medium representing the signals arriving at the detectors from one of the seismic wave disturbances, a carriage drive including a reversible motor and a clutch transmitting the drive from the motor to the carriage for moving said carriage from an initial position in a first direction to record said traces and for returning said carriage to said initial position following the recording, and an electrical control circuit for automatically controlling the initiation of the seismic wave disturbances and the movements of the carriage and the recording medium, said circuit including a first switch engaged by the carriage at the completion of the recording of each set of traces, a second switch engaged by the carriage as it is returned to said initial position, said circuit having a first subcircuit including said second switch and effective when said second switch is disengaged with said carriage in said initial position to energize said clutch in order to connect the drive motor to the carriage, a second subcircuit for supplying drive signals to the motor and including sets of contacts of first and second motor control relays and contacts of a motor reversing relay, said second circuit being effective with the carriage in its initial position to drive the motor in a forward direction so that with the clutch engaged the carriage is moved in said first direction, said second switch when engaged by the carriage at the completion of the recording operation being effective to break said first subcircuit to de-energize the clutch and to energize a main control relay, a fourth subcircuit including contacts of the main control relay and effective when the latter is energized to supply current to a motor control circuit, said motor control circuit including a capacitor connected in series with the winding of the first motor relay so that the completion of the fourth subcircuit charges the capacitor through the winding of the first relay, thereby energizing the first relay to break said second subcircuit in order to stop the motor at the completion of the recording operation, a fifth subcircuit including contacts of the first relay for supplying power to the record supporting and moving means in order to advance the recording medium at the completion of the recording operation, means including contacts of the main control relay for completing a clutch energizing circuit to the clutch as soon as the main control relay is energized, said first relay being automatically deenergized to recomplete said second subcircuit as soon as said capacitor charges, said motor control circuit further including the winding of the motor reverse relay which is connected to be energized from said fourth subcircuit as soon as the capacitor charges and which, when energized, causes its contacts to reverse the drive through the second circuit to the motor, thereby returning the carriage to its initial position, said first switch when engaged by return of the carriage completing a circuit to discharge the capacitor through the winding of the second motor control relay whereupon the second relay is energized to break the second subcircuit, thereby stopping the motor, and means connecting said first switch to the main control relay to break the latter when the first switch is engaged, thereby to break the clutch energizing circuit to release the clutch and to reset the electrical control circuit for the next cycle of operation.

References Cited in the file of this patent

UNITED STATES PATENTS

| | | |
|---|---|---|
| 2,440,971 | Palmer | May 4, 1948 |
| 2,743,785 | Lee | May 1, 1956 |
| 2,861,507 | Palmer | Nov. 25, 1956 |
| 2,876,428 | Skelton | Mar. 3, 1959 |
| 3,011,856 | Palmer et al. | Dec. 5, 1961 |